(12) United States Patent  
Lutz

(10) Patent No.: US 10,275,218 B1  
(45) Date of Patent: Apr. 30, 2019

(54) APPARATUS AND METHOD FOR SUBTRACTING SIGNIFICAND VALUES OF FLOATING-POINT OPERANDS

(71) Applicant: ARM LIMITED, Cambridge (GB)

(72) Inventor: David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/793,063

(22) Filed: Oct. 25, 2017

(51) Int. Cl.
  *G06F 7/483* (2006.01)
  *G06F 7/485* (2006.01)
  (Continued)

(52) U.S. Cl.
  CPC .............. *G06F 7/485* (2013.01); *G06F 7/483* (2013.01); *G06F 7/49952* (2013.01); *G06F 7/5443* (2013.01)

(58) Field of Classification Search
  CPC .................................. G06F 7/483; G06F 7/485
  (Continued)

(56) References Cited

U.S. PATENT DOCUMENTS

| 4,999,803 | A * | 3/1991 | Turrini | G06F 7/485 708/505 |
| 7,707,236 | B2 * | 4/2010 | Srivastava | G06F 7/485 708/505 |

(Continued)

OTHER PUBLICATIONS

A. Beaumont-Smith et al., "Reduced Latency IEEE Floating-Point Standard Adder Architectures", 14th IEEE Symposium on Computer Arithmetic, pp. 35-42, 1999 (Year: 1999).*

(Continued)

*Primary Examiner* — Matthew D Sandifer
(74) *Attorney, Agent, or Firm* — Nixon & Vanderhye P.C.

(57) ABSTRACT

An apparatus and method are provided for subtracting a first significand value of a first floating-point operand and a second significand value of a second floating-point operand. Significand shift control circuitry asserts a shift signal when a difference is detected between at least one corresponding low order bit in the exponent values of the two floating-point operands. First processing circuitry is arranged to produce a first difference value by performing a first subtraction operation to subtract the second significand value from the first significand value when the shift signal is unasserted, and to subtract a right-shifted version of the second significand value from the first significand value when the shift signal is asserted. Second processing circuitry is arranged to produce a second difference value by performing a second subtraction operation to subtract the first significand value from the second significand value when the shift signal is unasserted, and to subtract a right-shifted version of the first significand value from the second significand value when the shift signal is asserted. First shift estimation circuitry is arranged to determine, from the significand values subjected to the first subtraction operation, a first estimated left shift amount, and similarly second shift estimation circuitry is arranged to determine, from the significand values subjected to the second subtraction operation, a second estimated left shift amount. Shifted difference value generation circuitry then produces, as a shifted difference value, the first difference value left shifted by the first estimated left shift amount when the first difference value is non-negative, and the second difference value left shifted by the second estimated left shift amount when the second difference value is non-negative. Such an approach can significantly reduce the time taken to generate a normalized difference value.

18 Claims, 15 Drawing Sheets

(51) Int. Cl.
  *G06F 7/499* (2006.01)
  *G06F 7/544* (2006.01)
(58) Field of Classification Search
  USPC .......................................................... 708/505
  See application file for complete search history.

(56) References Cited

U.S. PATENT DOCUMENTS

| | | | |
|---|---|---|---|
| 2013/0007084 A1* | 1/2013 | Nystad | G06F 7/485 |
| | | | 708/499 |
| 2013/0218938 A1* | 8/2013 | Dockser | G06F 7/485 |
| | | | 708/209 |
| 2014/0074903 A1* | 3/2014 | Swartzlander, Jr. | G06F 7/485 |
| | | | 708/505 |
| 2015/0142864 A1* | 5/2015 | Quinnell | G06F 7/485 |
| | | | 708/505 |
| 2017/0060532 A1* | 3/2017 | Ahmed | G06F 7/483 |
| 2018/0129474 A1* | 5/2018 | Ahmed | G06F 7/485 |

OTHER PUBLICATIONS

Simon C. Knowles, "Arithmetic processor design for the T9000 transputer," Proc. SPIE 1566, Advanced Signal Processing Algorithms, Architectures, and Implementations II, 1991 (Year: 1991).*

* cited by examiner

EXAMPLE OF CONSTRUCT LIM BLOCK FOR SIMPLE CASE
WHERE THERE IS A 6-BIT DIFFERENCE VALUE
AND A 5-BIT EXPONENT VALUE

```
exp_ge_8 = exp[4] | exp[3];

lim[7] = ~exp_ge_8 & ~exp[2] & ~exp[1];              // no shifting
lim[6] = ~exp_ge_8 & ~exp[2] & exp[1] & ~exp[0];     // 1-bit shift OK
lim[5] = ~exp_ge_8 & exp[2] & ~exp[1] & exp[0];      // 2-bit shift OK
lim[4] = ~exp_ge_8 & exp[2] & ~exp[1] & ~exp[0];     // 3-bit shift OK
lim[3] = ~exp_ge_8 & exp[2] & exp[1] & ~exp[0];      // 4-bit shift OK
lim[2] = ~exp_ge_8 & exp[2] & exp[1] & exp[0];       // 5-bit shift OK
lim[1] = ~exp_ge_8 & exp[2] & exp[1] & exp[0];       // 6-bit shift OK
lim[0] = 0; // don't care, never used as a limit for a 6-bit difference
```

FIG. 14

APPARATUS AND METHOD FOR SUBTRACTING SIGNIFICAND VALUES OF FLOATING-POINT OPERANDS

BACKGROUND

The present technique relates to an apparatus and method for subtracting significand values of floating-point operands.

It is common to use floating-point (FP) representation in data processing systems. A floating-point number includes a significand and an exponent indicating a significance of the bits of the significand. A normalised floating-point number has a significand of at least 1 and less than 2, and hence has the format 1.xxxxxx. When subtracting two floating-point numbers that are close to each other, this can result in the significand no longer being normalised, i.e. there can be a large number of leading 0s. In order to seek to re-normalise the significand of the result, a left shift operation can be performed on the difference value obtained by subtracting one significand from the other significand.

However, there can be significant latency involved in the determination of a normalised significand of the result obtained when subtracting two similar floating-point numbers, and accordingly it would be desirable to provide an improved mechanism for subtracting significand values in such situations.

SUMMARY

In one example arrangement, there is provided an apparatus comprising: input circuitry to provide a first significand value of a first floating-point operand and a second significand value of a second floating-point operand; significand shift control circuitry to assert a shift signal when a difference is detected between at least one low order bit of a first exponent value of the first floating-point operand and a corresponding at least one low order bit of a second exponent value of the second floating-point operand; first processing circuitry to produce a first difference value by performing a first subtraction operation to subtract the second significand value from the first significand value when the shift signal is unasserted, and to subtract a right-shifted version of the second significand value from the first significand value when the shift signal is asserted; second processing circuitry to produce a second difference value by performing a second subtraction operation to subtract the first significand value from the second significand value when the shift signal is unasserted, and to subtract a right-shifted version of the first significand value from the second significand value when the shift signal is asserted; first shift estimation circuitry to determine, from the significand values subjected to the first subtraction operation, a first estimated left shift amount; second shift estimation circuitry to determine, from the significand values subjected to the second subtraction operation, a second estimated left shift amount; and shifted difference value generation circuitry to produce, as a shifted difference value, the first difference value left shifted by the first estimated left shift amount when the first difference value is a non-negative value, and the second difference value left shifted by the second estimated left shift amount when the second difference value is a non-negative value.

In another example configuration, there is provided a method of operating an apparatus to subtract a first significand value of a first floating-point operand and a second significand value of a second floating-point operand, comprising: asserting a shift signal when a difference is detected between at least one low order bit of a first exponent value of the first floating-point operand and a corresponding at least one low order bit of a second exponent value of the second floating-point operand; employing first processing circuitry to produce a first difference value by performing a first subtraction operation to subtract the second significand value from the first significand value when the shift signal is unasserted, and to subtract a right-shifted version of the second significand value from the first significand value when the shift signal is asserted; employing second processing circuitry to produce a second difference value by performing a second subtraction operation to subtract the first significand value from the second significand value when the shift signal is unasserted, and to subtract a right-shifted version of the first significand value from the second significand value when the shift signal is asserted; determining, from the significand values subjected to the first subtraction operation, a first estimated left shift amount; determining, from the significand values subjected to the second subtraction operation, a second estimated left shift amount; and producing, as a shifted difference value, the first difference value left shifted by the first estimated left shift amount when the first difference value is a non-negative value, and the second difference value left shifted by the second estimated left shift amount when the second difference value is a non-negative value.

In a yet further example configuration, there is provided an apparatus comprising: input means for providing a first significand value of a first floating-point operand and a second significand value of a second floating-point operand; significand shift control means for asserting a shift signal when a difference is detected between at least one low order bit of a first exponent value of the first floating-point operand and a corresponding at least one low order bit of a second exponent value of the second floating-point operand; first processing means for producing a first difference value by performing a first subtraction operation to subtract the second significand value from the first significand value when the shift signal is unasserted, and to subtract a right-shifted version of the second significand value from the first significand value when the shift signal is asserted; second processing means for producing a second difference value by performing a second subtraction operation to subtract the first significand value from the second significand value when the shift signal is unasserted, and to subtract a right-shifted version of the first significand value from the second significand value when the shift signal is asserted; first shift estimation means for determining, from the significand values subjected to the first subtraction operation, a first estimated left shift amount; second shift estimation means for determining, from the significand values subjected to the second subtraction operation, a second estimated left shift amount; and shifted difference value generation means for producing, as a shifted difference value, the first difference value left shifted by the first estimated left shift amount when the first difference value is a non-negative value, and the second difference value left shifted by the second estimated left shift amount when the second difference value is a non-negative value.

BRIEF DESCRIPTION OF THE DRAWINGS

The present technique will be described further, by way of example only, with reference to examples thereof as illustrated in the accompanying drawings, in which:

FIG. 14 is a diagram illustrating the operation of the components shown in FIG. 13 for a specific example scenario.

DESCRIPTION OF EXAMPLES

Figure 1:
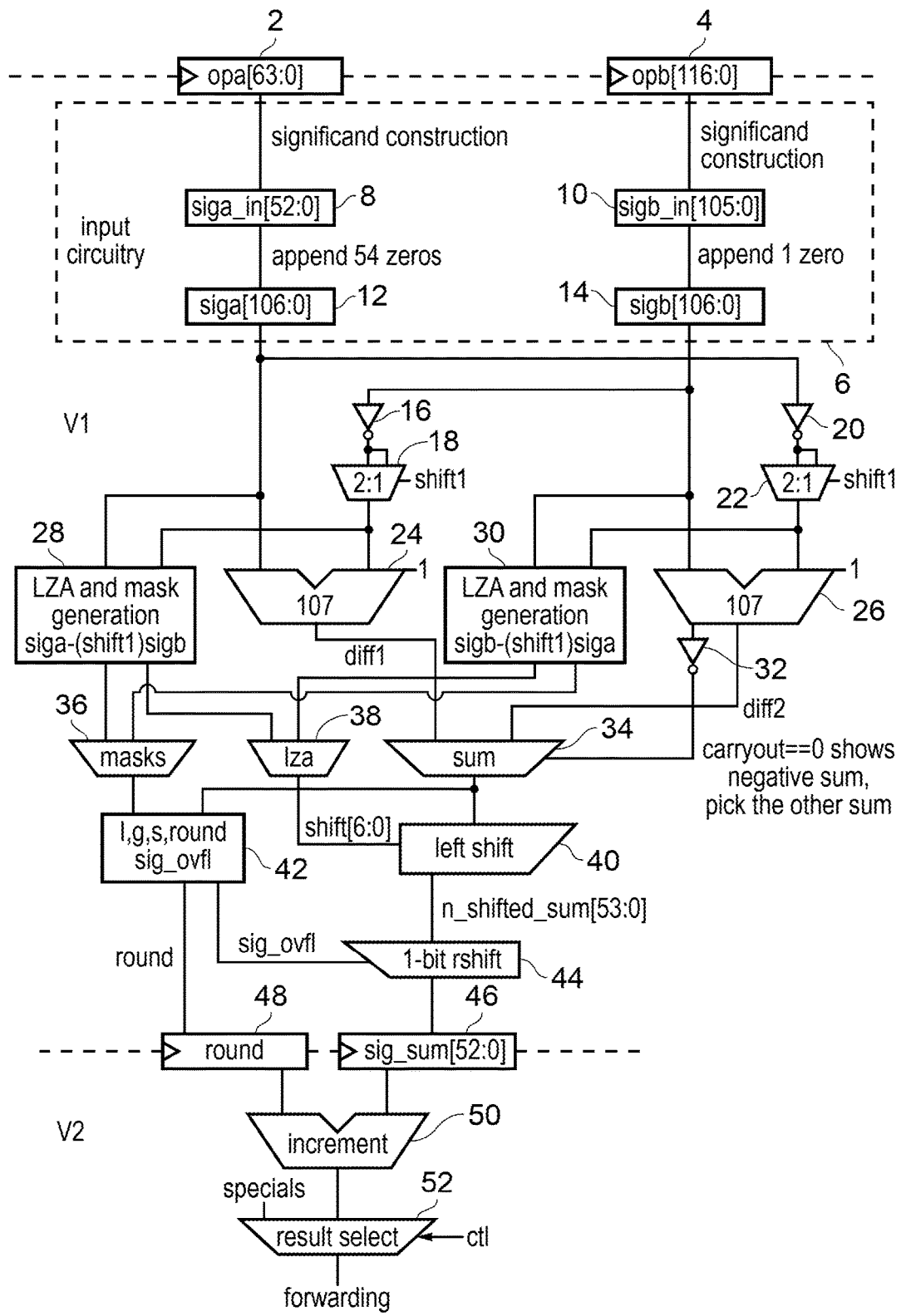
FIG. 1 is a diagram illustrating an apparatus used to subtract significand values of floating-point operands, in accordance with one example.

In one example configuration, an apparatus is provided that has input circuitry for providing a first significand value of a first floating-point operand and a second significand value of a second floating-point operand. The apparatus is used to perform a subtraction of the two significands with the aim of producing a non-negative difference. However, at the start of the process, it is not known which floating-point operand is larger. It is also not known whether the exponents of the two floating-point operands are the same, or differ by a certain amount. The apparatus of the examples described herein provides an efficient mechanism for computing the required difference under such circumstances.

In one example, the apparatus has significand shift control circuitry to assert a shift signal when a difference is detected between at least one low order bit of a first exponent value of the first floating-point operand and a corresponding at least one low order bit of a second exponent value of the second floating-point operand. By such an approach, it can be detected whether the exponents are the same, in which case the shift signal is not asserted, or differ by a certain amount, in which case the shift signal is asserted.

Having regard to the shift signal, first processing circuitry is then arranged to produce a first difference value by performing a first subtraction operation to subtract the second significand value from the first significand value when the shift signal is unasserted, and to subtract a right-shifted version of the second significand value from the first significand value when the shift signal is asserted. Hence, this enables the first subtraction operation to take account of whether the exponents of the two floating-point operands are the same or not.

However, at this point it is still not known which floating-point operand is larger, and hence which significand value should be subtracted from the other. Accordingly, the apparatus is arranged to provide second processing circuitry which operates in parallel with the first processing circuitry to produce a second difference value, by performing a second subtraction operation to subtract the first significand value from the second significand value when the shift signal is unasserted, and to subtract a right-shifted version of the first significand value from the second significand value when the shift signal is asserted. Hence, through the operation of the first and second processing circuits, two difference values are generated, each of which has taken into account whether a right shift of one of the significand values is required before the subtraction, based on the earlier comparison of at least one low order bit of the exponent values.

As mentioned earlier, when subtracting floating-point operands that are close to each other, it is likely that the difference value produced when subtracting the significands will require re-normalisation. The apparatus of the described examples includes, in association with each of the first and second processing circuits described above, corresponding shift estimation circuits. In particular, first shift estimation circuitry is used to determine, from the significand values subjected to the first subtraction operation, a first estimated left shift amount. Similarly, second shift estimation circuitry is arranged to determine, from the significand values subjected to the second subtraction operation, a second estimated left shift amount. In one example, the two shift estimation circuits can operate in parallel to the subtraction operations being performed by the first and second processing circuits.

Once the first and second difference values have been computed, it can be determined which one is non-negative. In particular, it will typically be the case that one of the difference values is positive and one is negative, in which event the positive difference value should be selected. It is also possible that both difference values will be zero, i.e. both of the results are non-negative, and in that case either difference value can be selected. The appropriate left shift amount then needs to be applied taking into account the difference value that is selected. Accordingly, in one example the apparatus further has shifted difference value generation circuitry to produce, as a shifted difference value, the first difference value left shifted by the first estimated left shift amount when the first difference value is a non-negative value, and the second difference value left shifted by the second estimated left shift amount when the second difference value is a non-negative value.

By such an approach, the apparatus provides a very efficient mechanism for subtracting significand values of two floating-point operands in situations where those floating point operands may have values close to each other. By analysing at least one low order bit of the two exponent values, it can be determined whether the significand value to be subtracted from the other significand value needs to first be right-shifted by a certain amount or not, hence avoiding the need to separately calculate both non-shifted and shifted variants of the subtraction operations. However, the computation of the differences does not need to wait until it is known which operand is larger, and instead the first and second processing circuits can operate in parallel to produce two different candidate difference values, one subtracting the (possibly right-shifted) second significand from the first significand, and the other subtracting the (possibly right-shifted) first significand from the second significand. Appropriate estimated left shift amounts required for normalisation can then be computed in parallel for both candidate difference values, and once the two candidate difference values have been computed, it can be determined which one to maintain for use in deriving the result, by assessing which is a non-negative value.

In one example, the left shifts can be applied to each of the candidate difference values prior to making that selection, or alternatively the selection can be made prior to performing any left shift, so that only a single left shift needs to be applied.

In one particular example, the apparatus is arranged so that only a single left shift needs to be applied. The shifted difference value generation circuitry may in that instance comprise selection circuitry to select, as a chosen difference value, one of the first difference value and the second difference value that is a non-negative value, and left shift circuitry to generate the shifted difference value by shifting the chosen difference value by the first estimated left shift amount when the chosen difference value is the first difference value, and by shifting the chosen difference value by the second estimated left shift amount when the chosen difference value is the second difference value. This provides further efficiencies by avoiding the need to duplicate left shift circuitry. It has been found that the decision as to which of the first and second difference values to select can be made very quickly, for example based purely on an evaluation of the carry out signal from one of the first and second processing circuits, hence enabling the selection between the first and second difference values to be made quickly enough to allow the selected difference value to be forwarded to the left shift circuitry without incurring any significant delay.

In one example arrangement, the first and second exponent values differ at most by one, and the significand shift control circuitry is arranged to assert the shift signal when a difference is detected between a least significant bit value of the first and second exponent values. In such embodiments, the apparatus can be provided as part of the near path circuitry of a processor, with the near path performing effective subtractions of floating-point operands where the exponents differ by zero or one, and with separate far path circuitry being used to perform effective subtractions when the exponents differ by more than one. By such an approach, it is only the near path circuitry that needs to accommodate for a non-trivial result normalisation, i.e. a normalisation of more than one bit position. When using the above described apparatus within the near path, this can significantly increase the speed of performing effective subtraction operations within the near path circuitry.

When the apparatus is used in situations where the first and second exponent values differ at most by one, then in situations where the shift signal is asserted, the right-shifted versions of the first and second significand values required for performing the first and second subtraction operations may be formed by right-shifting the first and second significand values, respectively, by one bit position.

There are a number of ways in which the input circuitry can be arranged to provide the first and second significand values. In one embodiment, the first and second significand values comprise a multi-bit fraction value of the corresponding first and second floating-point operands, and the input circuitry is arranged to provide the first and second significand values to include at least one padding bit to the right of a least significant fraction bit of the multi-bit fraction value. By adding such padding bits to the significand values, this can ensure that no information is lost in the event that the significands need to be subjected to a right-shifting operation in order to produce the versions of the significands to be processed by the first and second processing circuits.

Whilst in one example arrangement the two floating-point operands may be expressed using the same number of bits, and accordingly may have fraction values that are expressed using the same number of bits, in one example arrangement the fraction value of the second floating-point operand is expressed using more bits than the fraction value of the first floating-point operand, and the input circuitry is arranged to include more padding bits within the first significand value than within the second significand value so that the first and second significand values are expressed using the same number of bits. This simplifies the downstream processing of the significand values.

There are a number of reasons why the fraction value of the second floating-point operand may be expressed using a different number of bits to the fraction value of the first floating-point operand, but in one example arrangement the second floating-point operand is an unrounded multiplication result of a previously performed multiplication operation. Hence, in one example, the above described apparatus may be incorporated within a processor that can perform fused multiply accumulate operations of the form A−(B×C), with the second floating-point operand then representing the unrounded multiplication result for the computation B×C. Any required rounding can then be performed after the difference value has been computed using the above described apparatus.

In one embodiment, the input circuitry can also be arranged to construct the significands from the fraction information whilst taking into account the associated exponent values in order to determine whether the floating-point operand represents a normal number or a subnormal number. In particular, if the exponent value is non-zero, this indicates a normal floating-point operand, and the significand is hence of the form 1.fraction. However, if the exponent is zero, this indicates a subnormal value, in which case the significand should be of the form 0.fraction. Hence, in one embodiment the input circuitry is arranged to evaluate the exponent values when creating the significand values, and in particular is arranged to set a most significant bit of the first significand value to 1 when the first exponent value is non-zero, and is arranged to set a most significant bit of the second significand value to 1 when the second exponent value is non-zero. Otherwise, the most significant bit of the relevant significand value will be set equal to 0.

The first and second shift estimation circuits can be arranged in a variety of ways, but in one embodiment each of the first shift estimation circuitry and the second shift estimation circuitry comprise mask generation circuitry to generate one or more masks in parallel with the generation of the estimated left shift amount. Hence, in such examples it is not necessary for the estimated left shift amounts to be produced before the masks are created, and instead the masks can be created in parallel, thereby enabling for a faster generation of the mask information. The masks can be used for a variety of purposes, but in one example are used to detect a significand overflow condition where a corrective 1-bit right shift is required, and also to evaluate whether a rounding adjustment is required.

In one example, each of the first shift estimation circuitry and the second shift estimation circuitry further comprise significand analysis circuitry to generate, from analysis of the significand values subjected to the associated subtraction operation, a first bit string identifying a most significant bit position within the difference value produced by the associated subtraction operation that is predicted to have its bit set to a logic 1 value, and shift determination circuitry to determine the associated estimated shift amount in dependence on the first bit string. The mask generation circuitry is arranged to use the first bit string to produce the one or more masks at a same time or before the shift determination circuitry determines the associated estimated shift amount. Hence, the first bit string represents an intermediate value used to determine the estimated shift amount, and the mask generation circuitry is arranged to use that intermediate value when producing the one or more masks, so as to enable those masks to be produced at the same time or before the shift determination circuitry determines the associated estimated shift amount. By enabling the masks to be produced quickly in this manner, this can lead to some further performance benefits in the downstream processing. For example, the evaluation of the masks to determine rounding information and to detect the significand overflow condition may occur in parallel with the performance of a left shift operation on the relevant difference value using the associated estimated left shift amount.

In one example arrangement, the apparatus further comprises significand overflow detection circuitry to detect, based on said one or more masks, and at least one of the first difference value and the second difference value, an overflow condition where the shifted difference value will overflow, and shift correction circuitry, responsive to detection of the overflow condition, to perform a corrective shift operation such that the shifted difference value is right-shifted by one bit position. If the apparatus is arranged not to select between the first and second difference values until they have been subjected to their associated first and second estimated left shift amounts, then the significand overflow detection circuitry can be arranged to effectively detect whether there is an overflow condition for either of those two candidate shifted difference values, by using the masks and the relevant one of the first difference value or the second difference value for each determination. The shift correction circuitry could then perform corrective shift operations as required on each of the candidate shifted difference values, so that by the time one of those shifted difference values is selected, it will have been subjected to a corrective shift operation if required. However, in one embodiment a selection between the first and second difference values is made prior to any left shift operation being performed, and accordingly by the time the left shift operation is being performed, it is performed only on the selected one of those difference values. In that event, the significand overflow detection circuitry only needs to detect the presence of the overflow condition in respect of the difference value that has been selected, and in particular to determine whether, once that selected difference value has been left shifted by the appropriate amount, the overflow condition will be present. The shift correction circuitry can then perform a corrective shift operation on the shifted difference value as output from the left shift circuitry.

As mentioned earlier, the one or more masks may also comprise information used for rounding determination, and in that instance the apparatus may further comprise rounding determination circuitry to set a rounding bit value in dependence on a rounding determination operation performed using the one or more masks, and rounding circuitry to add the rounding bit value to the shifted difference value. Due to the early determination of the mask information as described earlier, it is possible for the rounding bit value to be determined by the rounding determination circuitry by the time the normalising left shift (and if appropriate corrective one bit right shift) have been applied in respect of the chosen difference value, so as to allow any required rounding adjustment to take place without further delay.

When re-normalising the difference value using the above described approach, the exponent value to be associated with the difference result needs to be decremented to compensate for the adjustment being made to the difference value. Exponent decrementing can become an issue when the exponent is already small, because floating-point numbers cannot have a true exponent below a predetermined minimum value. Accordingly, it is desirable that any proposed left shift produced by the shift estimation circuitry is qualified, so that a left shift will not be applied that results in the exponent being decremented below the minimum value. In one example configuration, the first and second shift estimation circuitry can incorporate functionality to achieve such a qualification in a fast and efficient manner. In particular, in one embodiment each of the first shift estimation circuitry and the second shift estimation circuitry further comprise shift limiting circuitry to generate from an exponent value a second bit string identifying a shift limit bit position, the shift limiting circuitry having computation circuitry to perform, for each bit position in at least a subset of bit positions of the second bit string, an associated computation using bits of the exponent value to determine a value for that bit position within the second bit string, the associated computation being different for different bit positions. Further combining circuitry is provided to generate a combined bit string from the first and second bit strings, with the shift determination circuitry being arranged to determine the associated estimated shift amount from the combined bit string.

Hence, rather than using the first bit string directly to determine the estimated shift amount, in such an example configuration a combined bit string is first generated by combining the first bit string produced by the significand analysis circuitry with a second bit string. By arranging the shift limiting circuitry to have computation circuitry as described above in order to compute the second bit string, directly using as inputs the bits of the exponent value, it has been found that a second bit string can be generated relatively quickly, and in one example can be generated in parallel with the generation of the first bit string.

Combining circuitry may then be used to generate a combined bit string from the first and second bit strings, whereafter shift determination circuitry can determine the estimated shift amount from the combined bit of string.

Such an approach provides a very efficient mechanism for qualifying the information contained within the first bit string produced by the significand analysis circuitry, so as to ensure that a left shift is not applied that would cause the exponent to require adjustment beyond a minimum allowed exponent value. Because the shift limiting circuitry performs associated computations for each bit position within the at least a subset of bit positions of the second bit string using directly the bits of the exponent value, there is no need to seek to compute a difference between the exponent value and the minimum allowed exponent value, allowing the qualification of the left shift amount to be performed very efficiently.

For each of the two paths (through the first processing circuitry and the second processing circuitry respectively) the exponent value used by the shift limiting circuitry of the associated shift estimation circuit is the exponent associated with the minuend of the subtraction operation. Hence within the first shift estimation circuitry the first exponent value is used by the shift limiting circuitry, whilst within the second shift estimation circuitry the second exponent value is used.

By using the techniques described above, it has been found that the shifted difference value can be produced from the first and second significand values in one clock cycle, hence providing a high performance approach for computation of the shifted difference value. Indeed, in situations where rounding is not required, this means that the final significand result is available in one clock cycle. This for example may be the case where the two floating-point operands are standard floating-point operands, and hence for example neither one of them is an unrounded multiplication result.

In situations where the second floating-point operand is an unrounded multiplication result of a previously performed multiplication operation, it has been found that both the shifted difference value and the rounding bit value may be produced from the first and second significand values in one clock cycle. The rounding circuitry can then be arranged to add the rounding bit value to the shifted difference value in a subsequent clock cycle. Such an operation can be performed very quickly, meaning that a significant proportion of the second clock cycle is available for other purposes, for example for forwarding the result to other components within the system. Hence, even in situations where rounding is needed, the significand result value can be made available early on in the second clock cycle allowing further useful operations to be performed during that second clock cycle using the determined significand result.

Particular examples will now be described with reference to the Figures.

Floating-point (FP) is a useful way of approximating real numbers using a small number of bits. The IEEE 754-2008 FP standard proposes multiple different formats for FP numbers including binary 64 (also known as double precision, or DP), binary 32 (also known as single precision, or SP), and binary 16 (also known as half precision, or HP). The numbers 64, 32, and 16 refer to the number of bits required for each format.

FP numbers are quite similar to the "scientific notation" taught in science classes, where instead of negative two million we'd write $-2.0 \times 10^6$. The parts of this number are the sign (in this case negative), the significand (2.0), the base of the exponent (10), and the exponent (6). All of these parts have analogs in FP numbers, although there are differences, the most important of which is that the constituent parts are stored as binary numbers, and the base of the exponent is always 2.

More precisely, FP numbers all consist of a sign bit, some number of biased exponent bits, and some number of fraction bits. In particular, the formats of interest consist of the following bits:

| format | sign | exponent | fraction | exponent bias |
|---|---|---|---|---|
| DP [63:0] | 63 | 62:52 (11 bits) | 51:0 (52 bits) | 1023 |
| SP [31:0] | 31 | 30:23 (8 bits) | 22:0 (23 bits) | 127 |
| HP [15:0] | 15 | 14:10 (5 bits) | 9:0 (10 bits) | 15 |

The sign is 1 for negative numbers and 0 for positive numbers. Every number, including zero, has a sign.

The exponent is biased, which means that the true exponent differs from the one stored in the number. For example, biased SP exponents are 8-bits long and range from 0 to 255. Exponents 0 and 255 are special cases, but all other exponents have bias 127, meaning that the true exponent is 127 less than the biased exponent. The smallest biased exponent is 1, which corresponds to a true exponent of −126. The maximum biased exponent is 254, which corresponds to a true exponent of 127. HP and DP exponents work the same way, with the biases indicated in the table above.

SP exponent 255 (or DP exponent 2047, or HP exponent 31) is reserved for infinities and special symbols called NaNs (not a number). Infinities (which can be positive or negative) have a zero fraction. Any number with exponent 255 and a nonzero fraction is a NaN. Infinity provides a saturation value, so it actually means something like "this computation resulted in a number that is bigger than what we can represent in this format." NaNs are returned for operations that are not mathematically defined on the real numbers, for example division by zero or taking the square root of a negative number.

Exponent zero, in any of the formats, is reserved for subnormal numbers and zeros. A normal number represents the value:

$$-1^{sign} \times 1.\text{fraction} \times 2^e$$

where e is the true exponent computed from the biased exponent. The term 1.fraction is called the significand, and the 1 is not stored as part of the FP number, but is instead inferred from the exponent. All exponents except zero and the maximum exponent indicate a significand of the form 1.fraction. The exponent zero indicates a significand of the form 0.fraction, and a true exponent that is equal to 1-bias for the given format. Such a number is called subnormal (historically these numbers were referred to as denormal, but modern usage prefers the term subnormal).

Numbers with both exponent and fraction equal to zero are zeros.

The following table has some example numbers in HP format. The entries are in binary, with '_' characters added to increase readability. Notice that the subnormal entry (4th line of the table, with zero exponent) produces a different significand than the normal entry in the preceding line.

| Sign | 5-bit exponent | 10-bit fraction | 11-bit significance | value |
|---|---|---|---|---|
| 0 | 01111 | 00_0000_0000 | 100_0000_0000 | $1.0 \times 2^0$ |
| 1 | 01110 | 10_0000_0000 | 110_0000_0000 | $-1.1 \times 2^{-1}$ |
| 0 | 00001 | 10_0000_0000 | 110_0000_0000 | $1.1 \times 2^{-14}$ |
| 0 | 00000 | 10_0000_0000 | 010_0000_0000 | $0.1 \times 2^{-14}$ |
| 1 | 11111 | 00_0000_0000 | | −infinity |
| 0 | 11111 | 00_1111_0011 | | NaN |

A large part of the complexity of FP implementation is due to subnormals, therefore they are often handled by microcode or software. Subnormals can be handled in hardware, speeding up these operations by a factor of 10 to 100 compared to a software or microcode implementation.

The FP way of handling signs is called sign-magnitude, and it is different from the usual way integers are stored in the computer (two's complement). In sign-magnitude representation, the positive and negative versions of the same number differ only in the sign bit. A 4-bit sign-magnitude integer, consisting of a sign bit and 3 significand bits, would represent plus and minus one as:

+1=0001

−1=1001

In two's complement representation, an n-bit integer i is represented by the low order n bits of the binary n+1-bit value $2^n+i$, so a 4-bit two's complement integer would represent plus and minus one as:

+1=0001

−1=1111

The two's complement format is practically universal for signed integers because it simplifies computer arithmetic.

A fixed-point number looks exactly like an integer, but actually represents a value that has a certain number of fractional bits. Sensor data is often in fixed-point format, and there is a great deal of fixed-point software that was written before the widespread adoption of FP. Fixed-point numbers are quite tedious to work with because a programmer has to keep track of the "binary point", i.e. the separator between the integer and fractional parts of the number, and also has to constantly shift the number to keep the bits in the correct place. FP numbers don't have this difficulty, so it is desirable to be able to convert between fixed-point numbers and FP numbers. Being able to do conversions also means that we can still use fixed-point software and data, but we are not limited to fixed-point when writing new software.

Most FP operations are required by the IEEE-754 standard to be computed as if the operation were done with unbounded range and precision, and then rounded to fit into an FP number. If the computation exactly matches an FP number, then that value is always returned, but usually the computation results in a value that lies between two consecutive floating-point numbers. Rounding is the process of picking which of the two consecutive numbers should be returned.

There are a number of ways of rounding, called rounding modes; six examples of these are:

| Mode | definition |
| --- | --- |
| RNE | round-to nearest, ties to even pick the closest value, or if both values are equally close then pick the even value |
| RNA | round to nearest, ties to away pick the closest value, or if both values are equally close then pick the value farthest away from zero |
| RZ | round to zero pick the value closest to zero |
| RP | round to plus infinity pick the value closest to plus infinity |
| RM | round to minus infinity pick the value closest to minus infinity |
| RX | round to odd pick the odd value |

The definition doesn't tell us how to round in any practical way. One common implementation is to do the operation, look at the truncated value (i.e. the value that fits into the FP format) as well as all of the remaining bits, and then adjust the truncated value if certain conditions hold. These computations are all based on:

L—(least) the least significant bit of the truncated value
G—(guard) the next most significant bit (i.e. the first bit not included in the truncation)
S—(sticky) the logical OR of all remaining bits that are not part of the truncation Given these three values and the truncated value, we can always compute the correctly rounded value according to the following table:

| mode | change to the truncated value |
| --- | --- |
| RNE | increment if (L&G)|(G&S) |
| RNA | increment if G |
| RZ | None |
| RP | increment if positive & (G|S) |
| RM | increment if negative & (G|S) |
| RX | set L if G|S |

For example, consider multiplying two 4-bit significands, and then rounding to a 4-bit significand.

$sig1=1011$(decimal 11)

$sig2=0111$(decimal 7)

multiplying yields $$sig1 \times sig2 = 1001\_101 \text{ (decimal 77)}$$
$$\phantom{sig1 \times sig2 = }L\ Gss$$

The least significant bit of the truncated 4-bit result is labeled L, the next bit G, and S is the logical OR of the remaining bits labeled s (i.e. S=0|1=1). To round, we adjust our 4-bit result (1001) according to the rounding mode and the computation in the table above. So for instance in RNA rounding, G is set so we return 1001+1=1010. For RX rounding G|S is true so we set L to 1 (it's already 1, so in this case nothing changes) and return 1001.

The example configurations described hereafter with reference to the Figures are used to subtract significand values of floating-point operands.

Floating-point numbers are typically normalised, which means that in the usual case (and ignoring the sign) they have the format $1.\text{fraction} \times 2^e$ for a number with exponent e and stored binary fraction fraction. If two numbers that are close to each other are subtracted the result might no longer be normalised. For example, suppose it is desired to compute 65−63=2. In binary FP form, these numbers might be represented as $65-63=1.000001 \times 2^6 - 1.111110 \times 2^5$ In order to complete the subtraction the numbers are aligned so that the exponents are equal:

$1.000001 \times 2^6 - 0.111111 \times 2^6 = 0.0000010 \times 2^6$

The result of the subtraction is not normalised, so it needs to be left shifted 5 places along with the equivalent exponent adjustment, giving the answer $1.000000 \times 2^1 = 2$ A processor may be provided with circuitry for performing effective subtraction of two floating-point numbers whose exponents differ by 0 or 1, such circuitry often being referred to as near path circuitry. Subtraction of two floating-point numbers whose exponents differ by more than one can be handled by separate circuitry, often referred to as far path circuitry, using any of a number of known standard techniques. It is only when performing near path operations that there may be a requirement for result normalisation of more than one bit position, and hence only the near path circuitry needs to provide appropriate left shift circuitry to allow for multi-bit shifting of the difference value. The examples discussed hereafter with reference to the figure are used to describe components provided to process the significands of two floating-point operands that are being subtracted within near path circuitry.

In particular, FIG. 1 shows an example configuration of significand processing logic that may be provided as part of the near path circuitry of a processor. Two operands 2, 4 are received in the storage elements 2, 4. In the particular example considered here, operand A is a 64-bit value representing a double-precision (DP) number, whilst operand B is a 117-bit value representing an unrounded DP product produced from a multiplier as part of a fused multiply-add (FMA) operation. In accordance with this format, the sign bit is bit 116, the exponent is formed by bits 115 through 105, and the fraction portion is formed by bits 104 to 0. Accordingly, operand B is essentially a DP number with a much wider fraction. In situations where the apparatus is not being used to perform FMA operations, and instead is performing a standard subtraction of two DP numbers, the high-order 64-bits of operand B (i.e. bits 116 to 53) are used to represent the DP number, and the bottom 53 bits (i.e. bits 52 to 0) are all set to 0.

The input circuitry 6 is used to construct the significand of each operand from the value stored in the elements 2, 4. In each case, the fraction bits are extracted, and then an implicit 1 bit is added at the most significant bit position assuming the operand is considered to be a normal floating-point operand, or instead a logic 0 value is added at the most significant bit position if the floating-point operand is considered to be a subnormal value. To assess this, each of the exponent bits of each operand can be evaluated to determine whether they are non-zero. Non-zero exponent values imply normal significands, so that they begin with an implicit 1. In contrast, if the exponent value is 0, this will be considered to be a subnormal operand, and an implicit 0 will be added as the most significant bit of the significand.

Accordingly, by virtue of this process, it will be seen that initial significand values 8, 10 are created by extracting the fraction bits, and prepending a 1 or a 0 dependent on whether the operand is considered to be normal or subnormal. Further, the input circuitry is arranged to pad the significand of operand A with 0s to make it the same length as the significand of operand B, and both significands are then padded with one additional bit so as to ensure that no information is lost if the smaller significand is right-shifted by one bit. Hence, it can be seen that the significands denoted by the elements 12, 14 may be constructed as follows for normal operands:

fraca[51:0]=opa[51:0]

fracb[104:0]=opb[104:0]

siga[106:0]={implicit one bit,fraca[51:0].54 zeros bits} sigb[106:0]={implicit one bit,fracb[104:0],1 zero bit}

Figure 2A:
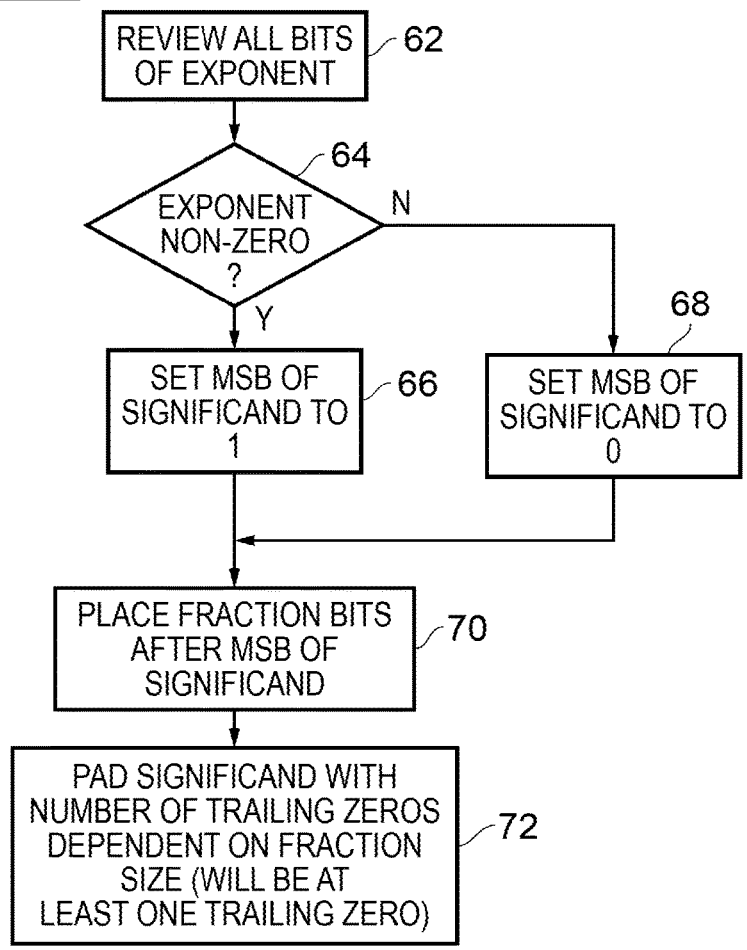
FIG. 2A is a flow diagram illustrating how the input circuitry of FIG. 1 is used in one example to create the significand values processed by the remainder of the apparatus.

FIG. 2A is a flow diagram illustrating the above described significand creation process performed by the input circuitry 6. In particular, the process of FIG. 2A is performed for each input operand. At step 62, all bits of the exponent value of the operand are reviewed in order to determine whether the exponent is non-zero. If at step 64 it is determined that the exponent is non-zero, then the most significant bit of the significand is set to 1 at step 66, whereas otherwise the most significant bit of the significand is set to 0 at step 68.

Following steps 66 or 68, then the fraction bits of the operand are placed after the most significant bit of the significand at step 70. At step 72, the significand is then padded with a number of trailing 0s dependent on the fraction size. As will be apparent from the above discussion there will be at least one trailing 0 added, which ensures that no information will be lost if that significand is subsequently subjected to a one bit right shift.

The circuitry in FIG. 1 begins the near-path subtraction operation without knowing which floating-point operand is larger. The circuitry is required to produce a non-negative difference, and hence uses two adder circuits 24, 26 to perform the two subtractions, siga–sigb and sigb–siga. However, as will be apparent from the earlier discussion, if the exponents differ by one, it will be necessary to right shift the smaller significand so that the exponents can be made equal, and at the start of the process it is not known whether the exponents differ by 0 or 1.

As shown in FIG. 1, each of the adder circuits 24, 26 is used in combination with associated inverters 16, 20 to perform twos complement addition, so that the second input to the adder is inverted, and the adder receives a carry in value of 1. As a result, the adders perform an effective subtraction of the two input significands.

As further shown, the output from the inverters 16, 20 is used to generate two inputs to the multiplexers 18, 22, namely the original inverted value, and a 1-bit right-shifted version of the inverted value. One of those values is then selected for propagation as the second input to the associated adder circuitry 24, 26 in dependence on the shift1 control signal.

Figure 2B:
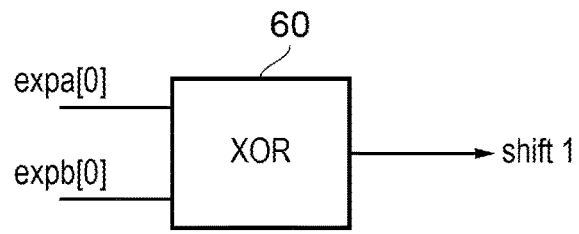
FIG. 2B illustrates circuitry that may be used to generate the "shift1" signal used by the apparatus of FIG. 1 in accordance with one example.

In the described example, the shift1 control signal is evaluated by comparing the least significant bit of the exponent values of both input operands, and in particular by performing an XOR operation 60 as shown in FIG. 2B. Hence, it can be seen that the exponents are evaluated for this purpose as follows:

expa[10:0]=opa[62:52]

expb[10:0]=opb[115:105]

shift1=expa[0]^expb[0]

Accordingly, if the shift one control signal is not asserted, the unshifted version will be forwarded as the second input for the adders, whilst if the shift1 signal is asserted, the 1-bit right-shifted version will be provided as the second input to the adders. Hence, it will be seen that the two adder circuits 24, 26 perform the following computations respectively:

diff1=siga[106:0]−(possibly 1-bit right shifted)sigb[106:0] and diff2=sigb[106:0]−(possibly 1-bit right shifted)siga[106:0]

Hence it will be seen that, by producing the shift1 signal, it is possible to reduce the number of potential subtraction operations required from four to two, since it can be determined whether the significand value being subtracted from the other significand value needs to be 1-bit right shifted or not.

As mentioned earlier, it is required that a non-negative difference is produced. This can readily be determined once the first and second difference values have been computed, by reviewing the carry-out information from one of the adders. In particular, when computing X−Y, the carry-out value will be set to 1 if X is greater than or equal to Y, and the difference X−Y is thus non-negative (i.e. it is either positive or 0). In the example shown in FIG. 1, the carry-out from the second adder 26 is inverted by the inverter 32 and used as the control signal for the multiplexer 34 that is arranged to choose between the first and second difference values. Accordingly, if the second difference value is non-negative, it will be selected by the multiplexer (in this example a logic 0 control signal to the multiplexer 34 causes the right-hand input to be selected), whereas otherwise the first difference value will be selected.

In parallel with the operations of the adder circuits 24, 26, shift estimation circuits 28, 30 are provided to compute a leading zero anticipation (LZA) value and one or more mask values by analysing the significand values that are actually input to the associated adder circuits 24, 26. Hence, each of the shift estimation circuits 28, 30 will receive the significand value provided as a first input to the corresponding adder circuit 24, 26, and also the significand value provided as the second input to the corresponding adder circuit 24, 26, which as discussed earlier may be the original non-shifted value or a 1-bit right shifted value, dependent on the value of the shift1 control signal.

Each shift estimation circuit 28, 30 is arranged to generate an LZA value used to identify an estimated left shift amount to apply to the associated difference value in order to normalise it, and also to generate one or more mask values that can be used during rounding determination, and also to detect a significand overflow condition. The LZA values from each shift estimation circuit 28, 30 are forwarded as inputs to the multiplexer 38, whilst the masks produced by both estimation circuits 28, 30 are provided as inputs to the multiplexer 36. The multiplexers 36, 38 can be driven by the same control signal used by the multiplexer 34, so as to select appropriate LZA and mask values dependent on which difference value is selected by the multiplexer 34.

The operation of the shift estimation circuits 28, 30 will be discussed in more detail later, for a particular example configuration. However, as schematically shown in FIG. 1, in the described examples the shift estimation circuits can be arranged so that they can produce the LZA and mask information in parallel with the generation of the difference values by the adders 24, 26.

The chosen difference value selected by the multiplexer 34 is provided as an input to the left shift circuitry 40, which also receives from the multiplexer 38 the corresponding estimated left shift amount produced by the relevant shift estimation circuit 28, 30. The input value is then left shifted by the LZA value provided by the multiplexer 38 in order to produce a shifted difference value that is input to the selective 1-bit right shift circuitry 44.

The mask information from the relevant shift estimation circuit 28, 30 is routed from the multiplexer 36 to the round and significand overflow circuitry 42. The operation of this circuitry will be discussed in more detail later, but in essence it uses the mask information and the chosen difference value selected by the multiplexer 34 to detect a significand overflow condition, and in that instance to send a control signal to the 1-bit right shift logic 44 to cause the output from the left shift circuitry to be subjected to a corrective 1-bit right shift in the presence of a significand overflow. Otherwise, the output from the left shift circuitry is passed unchanged through the right-shift circuitry 44. The resulting difference value is stored within the storage element 46. In particular, the most significant 53-bits are stored within the storage element 46.

The circuitry 42 also evaluates the mask information in order to determine whether to insert a rounding bit at a logic 1 value or at logic 0 value, with the determined rounding bit being stored within the storage element 48. This hence enables the rounding bit to be set appropriately having regards to the appropriate rounding mode, so that that rounding bit can then subsequently be added to the value stored in the storage element 46 by the increment circuitry 50 in order to produce the rounded result provided as one input to the result selection multiplexer 52.

In accordance with standard mechanisms, separate circuitry can be used to detect certain special conditions, for example where the result is a NaN (not a number), a value of infinity, etc. The result selection multiplexer 52 can then be driven by an appropriate control signal to either select the output from the increment circuitry 50, or one or more special values, with the output being a final result of the difference computation performed in respect of the significands, which can then be forwarded to other components within the processor.

As shown in FIG. 1, the majority of the computation can be performed in a single clock cycle. Further, most of the second clock cycle is available for forwarding, because the 53-bit increment and 2-input mux processing illustrated consumes less than a quarter of the cycle in one illustrative example configuration.

In situations where rounding is not required, then it is possible to perform the entire significand processing operation in a single cycle in some implementations. For example, in an implementation that does not support FMA additions, then the 107-bit adders and shift estimation circuits in the first processing stage can be replaced by faster and smaller 54-bit units, and no rounding is required so that the second cycle processing step shown become unnecessary. This can enable DP near-path add/subtract operations to be performed in less than a single cycle.

Figure 3A:
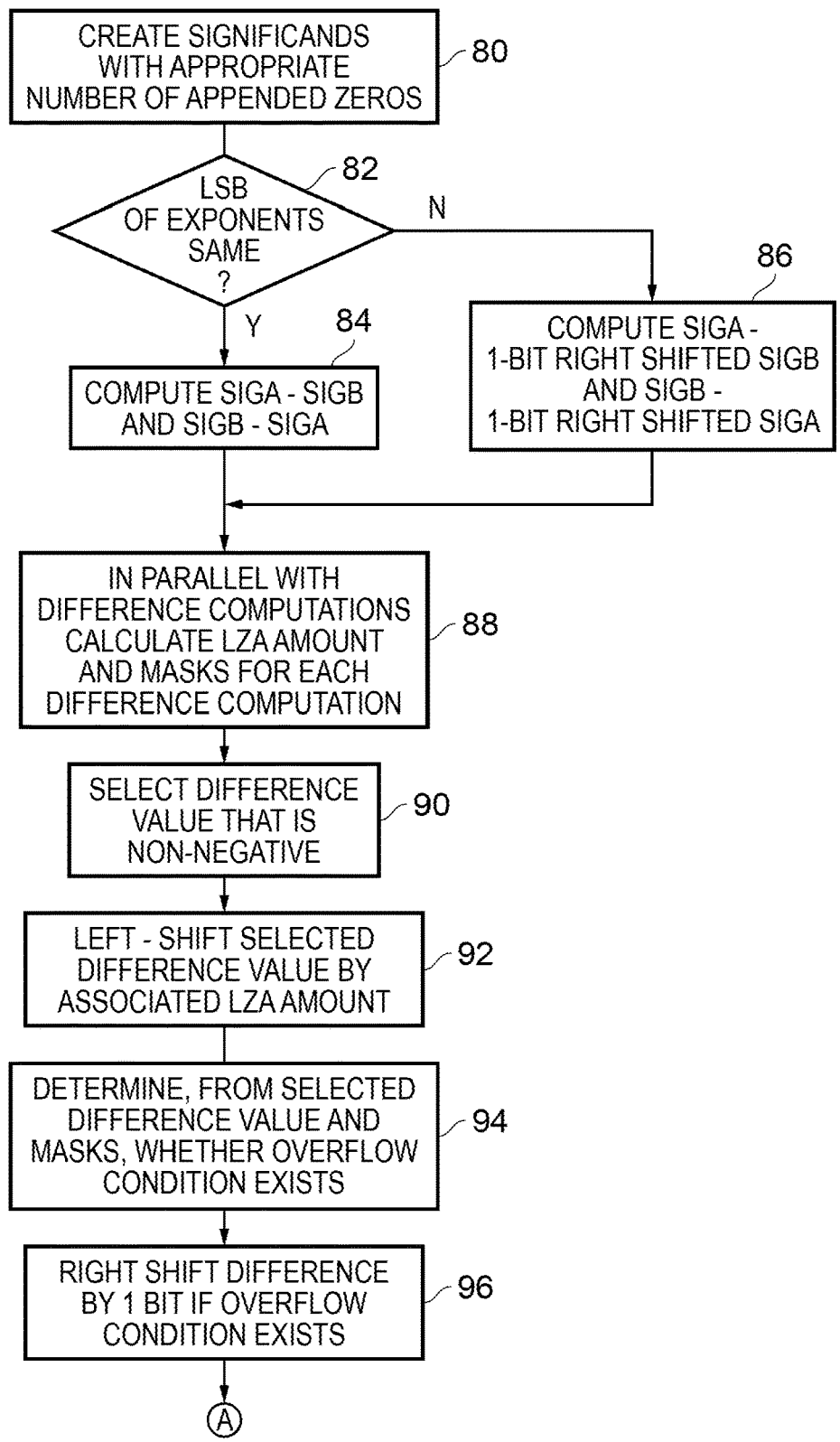
FIGS. 3A and 3B provide a flow diagram illustrating the operation of the apparatus of FIG. 1 in accordance with one example.
Figure 3B:
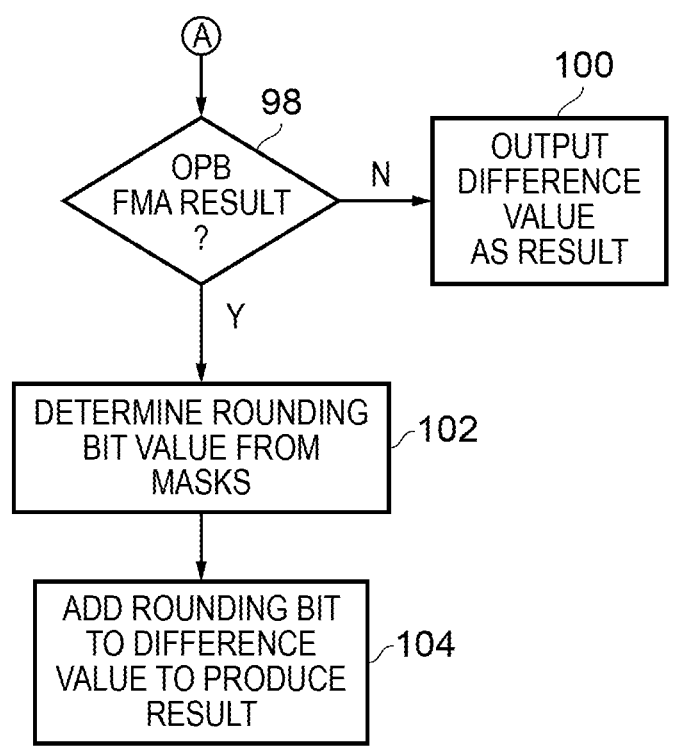

FIGS. 3A and 3B set out a flow diagram illustrating the operation of the apparatus of FIG. 1 in one example. At step 80, the significands are created by the input circuitry 6, each being provided with an appropriate number of appended zeros. In the particular example shown in FIG. 1, it will be appreciated from the earlier description that 107-bit significands are formed, with significand A including 54 trailing zero bits, and significand B including 1 trailing zero bit.

At step 82, it is determined whether the least significant bit of each exponent is the same. As will be apparent from the earlier discussion, in the example configuration of FIG. 1 this is achieved by evaluation of the "shift1" signal.

If the exponents are the same, then the adder circuits 24, 26 of FIG. 1 are used to perform the computations siga−sigb and sigb−siga, at step 84. Otherwise, the process proceeds via step 86, where the two adders 24, 26 are used to perform the computations "siga−1-bit right-shifted sigb", and "sigb−1-bit right-shifted siga".

Irrespective of which of steps 84 or 86 are performed, at step 88, in parallel with the difference computations of steps 84, 86, an LZA amount and one or more masks are calculated for each of the two difference computations performed. As discussed earlier, these computations are performed by the LZA and mask generation circuits 28, 30, using as inputs the same significand values that are processed by the corresponding adders 24, 26.

At step 90, the difference value is selected that is non-negative. In the example of FIG. 1 this is achieved by using the output of the inverter 32 to drive the selection of the multiplexer 34.

At step 92, the selected difference value is then left-shifted by the associated LZA amount, using the left-shift circuitry 40.

At step 94, it is determined, with reference to the selected difference value and the one or more masks, whether a significand overflow condition exists, in the example of FIG. 1 this being performed by the circuitry 42. As is apparent from FIG. 1, step 94 can be performed in parallel with the left-shift operation performed at step 92.

At step 96, the left-shifted difference value output by the circuitry 40 is then right-shifted by one bit if the significand overflow condition is determined to exist, using the circuitry 44 of FIG. 1.

At step 98, it is determined whether operand B was a fused multiply accumulate (FMA) result or not. If it is not, then no rounding will be required, and the process can proceed to step 100 where the difference value can then be output as the result. In one embodiment, the result select circuitry 52 will still be used, to accommodate the selection of any special values if required.

If at step 98 it is determined that operand B is a FMA result, then the process proceeds via steps 102 and 104. At step 102, a rounding bit value is determined from the one or more masks, using the circuitry 42. This will result in a rounding bit of either 0 or 1 being stored in the storage element 48. As will be apparent from FIG. 1, step 102 can be performed at the same time as step 94, i.e. at the same time as assessing the significand overflow condition.

At step 104, the rounding bit is then added to the difference value by the increment circuitry 50, in order to produce the difference value that is then used as the final result. As with step 100, the result selection circuitry 52 may be used to allow selection of any special values instead of the computed difference value, if required.

Figure 4:
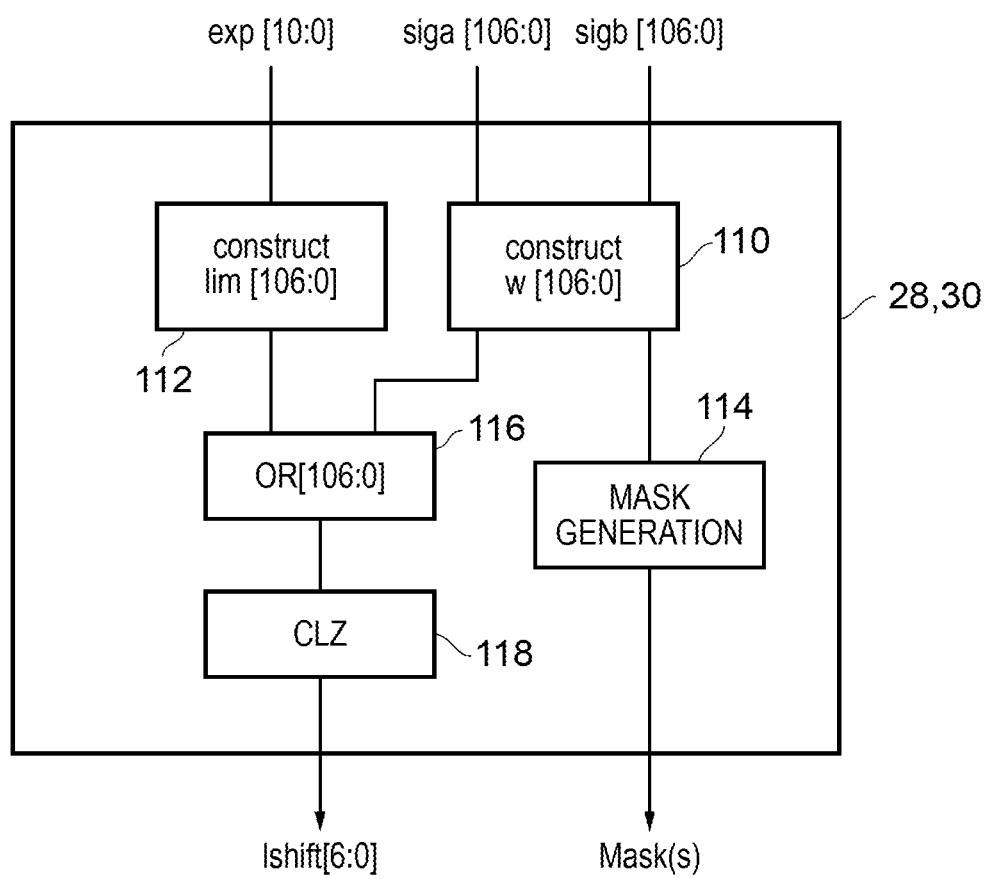
FIG. 4 is a block diagram illustrating components provided within the leading zero anticipator and mask generation blocks of FIG. 1 in accordance with one example.

FIG. 4 is a block diagram illustrating in more detail components provided within each of the shift estimation circuits 28, 30 of FIG. 1 (also referred to herein as LZA and mask generations circuits), in accordance with one example configuration. Each shift estimation circuit 28, 30 includes two bit string construction blocks 110, 112. A first bit string is produced by the construct w block 110, this block receiving the versions of the first and second significands as input to the associated adder circuits 24, 26, and performing an analysis of those significands in order to produce an estimate of the number of leading zeros that will be present within the difference value computed by the associated adder circuit. Any standard LZA circuitry can be used to implement the construct w block 110.

As will be appreciated by those skilled in the art, the output from the construct w block 110 will be a first bit string (which may also be referred to herein as an intermediate value) where the most significant logic one value is in the bit position where it is anticipated that there will be a leading one in the difference value computed by the associated adder circuit 24, 26. This prediction performed by the construct w block 110 will in one embodiment at most be out by one bit position, due to the potential for a carry-out from low order bits. As will be apparent from the earlier discussion of FIG. 1, it can later be determined if that prediction was out by one bit position, with a subsequent adjustment being made later within the processing path by the shift circuitry 44.

As also shown in FIG. 4, a construct lim block 112 is provided that operates in parallel with the construct w block 110, and generates a second bit string used to identify a shift limit bit position, based on evaluation of the exponent. In particular, the exponent value provided to the construct lim block 112 is the exponent associated with the minuend of the subtraction operation being performed by the associated adder circuit 24, 26. Hence, the construct lim block 112 in the shift estimation circuit 28 uses the exponent value expa and the construct lim block 112 in the shift estimation circuit 30 uses the exponent value expb. Based on the exponent value, the construct lim block 112 is arranged to generate the second bit string based purely on simple logical operations applied to the sequence of bits of the exponent value. In particular, as will be discussed in more detail later, for each bit position that can be associated with a possible left shift amount of the difference value, an associated computation is performed using the bits of the exponent value to determine a value for that bit position. In one embodiment, each bit of the exponent value is used at most once during the computation associated with any particular bit position within the second bit string.

In the example shown in FIG. 4, it is assumed that a 107-bit second bit string (and a corresponding 107-bit first bit string) is generated, so that the number of bits in each bit string match the number of bits in the difference value produced by the corresponding adder circuitry 24, 26, and accordingly both bit strings include information associated with each possible left shift amount of the difference value. In such an arrangement, within the construct lim block 112, a separate computation may be performed for each of the 107 bit positions in the second bit string. For each bit position, the computation performed may be different to the computation performed for any other bit position, but each computation will involve simple logical operations performed using bits of the exponent value, in one embodiment the logical operations comprising one or more of AND, OR and NOT operations.

Due to the simple logical operations performed by the construct lim block 112, and the fact that those logical operations operate directly on the bits of the exponent value, the second bit string can be generated relatively quickly, and in one embodiment the logic depth of the construct lim block 112 circuitry is no greater than the logic depth of the construct w block circuitry 110. In particular, by arranging the construct limit block 112 to perform a simple sequence of logical operations for each bit position in the bit string, directly using bits of the exponent value, there is no need for any time intensive subtraction or shifting operations to be performed, and this enables the second bit string to be generated at least as quickly as the first bit string.

The two bit strings are then provided to the combining circuitry 116, which in one embodiment performs a simple OR operation on the two input bit strings in order to generate a combined bit string that is then output to the count leading zeros (CLZ) circuit 118. The CLZ circuit 118 can operate in the standard manner, but rather than operating directly on the output of the construct w block 110, it now uses the combined bit string produced by the combining circuitry 116, and counts the number of leading zeros in the combined bit string in order to determine a left shift amount, which is then encoded in a seven bit value output from the circuits 28, 30. It will be appreciated that since the maximum left shift amount is 107 bits, all possible left shift amounts can be encoded within a seven bit left shift value output by the CLZ circuit 118.

By arranging the circuits 28, 30 to operate as shown in FIG. 4, this provides a highly efficient mechanism for qualifying the left shift amount produced from an analysis of the associated two input significands, so as to ensure that a left shift is not applied that exceeds the maximum left shift appropriate having regard to the exponent value. In particular, it will be appreciated that if the second bit string output by the construct lim block 112 has a most significant one at a more significant bit position than the most significant one in the first bit string produced by the construct w block 110, then after the two bit strings have been combined, the number of leading zeros detected by the CLZ circuit 118 will be determined by the leading one in the second bit string produced by the construct lim block 112, hence producing a lower left shift amount than would have been the case had the output from the construct w block 110 been analysed directly by the CLZ circuitry 118.

In one embodiment, the computation circuitry associated with the most significant bit position of the 107-bit second bit string is arranged to set that most significant bit to a logic one value when the exponent value is either the minimum exponent value for a normal floating-point value or a reserved exponent value used for a subnormal floating-point value. Hence, in accordance with the IEEE 754 formats discussed above, if the biased exponent is one or zero, the most significant bit in the second bit string will be set. It will be appreciated that this will mean that the CLZ circuit 118 will not detect any leading zeros and no left shift will be applied. Hence, the circuitry can automatically take into account the fact that a biased exponent of one or a biased exponent of zero actually refer to the same minimum exponent value, and hence prevents any left shifting if the biased exponent is either one or zero.

It is also useful to be able to determine whether the left shift has been constrained by the second bit string or not. In particular, if the most significant 1 in the second bit string is in the same bit position as the most significant 1 in the first bit string, this will indicate that the left shift amount indicated by the first bit string is allowed to be performed, but will result in the exponent then taking on the minimum exponent value for a normal floating-point value, i.e. a biased exponent value of one. However, if instead the left shift amount is limited by the most significant one in the second bit string, this indicates that the difference value will be subjected to a left shift that is insufficient to enable it to be fully normalised (i.e. converted into a significand of the form 1.xxx) and accordingly this means that the associated biased exponent should have a value of zero, indicating that the result is a subnormal result.

In one embodiment, this determination can be made based on analysis of the first and second bit strings output by the construct w block 110 and construct lim block 112, respectively. In particular, when it is detected that the second bit string will limit the left shift amount, a signal can be forwarded to exponent handling circuitry (not shown in FIG. 1) to cause the result exponent to be set to a biased exponent of zero, to identify a subnormal result.

With regard to the timing impact of the LZA circuit components within the circuitry 28, 30 shown in FIG. 4, by computing the value for each bit of the second bit string directly from the eleven bits of the exponent value, it has been found that this computation can be done with a logic depth of about five 2-input gates. In practice, this turns out to represent a slightly lower logic depth than the logic depth required by the construct w block 110. Accordingly, the only additional delay relative to the CLZ circuitry 118 directly using the output from the construct w block 110 is the 2-input OR gate that combines the first and second bit strings. However, as discussed above, the circuitry 28, 30 is able to automatically qualify the output from the construct w block 110 so as to prevent a left shift being applied that would require the exponent to be decremented below the minimum allowed value, hence avoiding the need for any further steps to be taken to achieve that qualification.

In addition to the above computations performed to calculate the estimated left shift amount, the circuits 28, 30 also generate one or more masks. In particular, as shown in FIG. 4, the intermediate value (w) produced by the construct w block 110 is separately provided to mask generation circuitry 114 in order to generate one or more bitmasks. The operation of the mask generation circuitry 114 will be shown in more detail later. However, one or more of these masks are passed to the round and significand overflow circuitry 42 of FIG. 1, which uses one or more of the masks produced by the mask generation circuitry 114 to determine whether or not a significand overflow has occurred. A significand overflow occurs when the significand increases in size due to a bit being carried during the calculation performed by the associated adder circuitry 24, 26. If this occurs, then as discussed earlier with reference to FIG. 1 a right bit-shifter 44 may be used to shift the significand one bit to the right in order to compensate. In the circuitry of FIG. 1, the mask generation circuitry 114 produces the masks from the intermediate value (w) and hence produces the masks at the same time or before the count circuitry 118 completes the counting operation. In this way, it is possible for the overflow and rounding circuitry 42 to more quickly determine whether or not there has been a significand overflow.

More details as to how the construct lim block can be used to qualify a left shift amount produced from an analysis of the two input significands, so as to ensure that a left shift is not applied that exceeds the maximum left shift appropriate having regard to the exponent value, is discussed in commonly owned co-pending U.S. patent application Ser. No. 15/473,841, the entire contents of which are hereby incorporated by reference. Further, more details as to how the mask generation block can be arranged to generate the required masks directly from the intermediate value w is discussed in commonly owned co-pending U.S. patent application Ser. No. 15/370,212, the entire contents of which are hereby incorporated by reference. However, for completeness, a description of the relevant figures from those patent applications is also provided hereafter as FIGS. 5 to 14.

Figure 5:
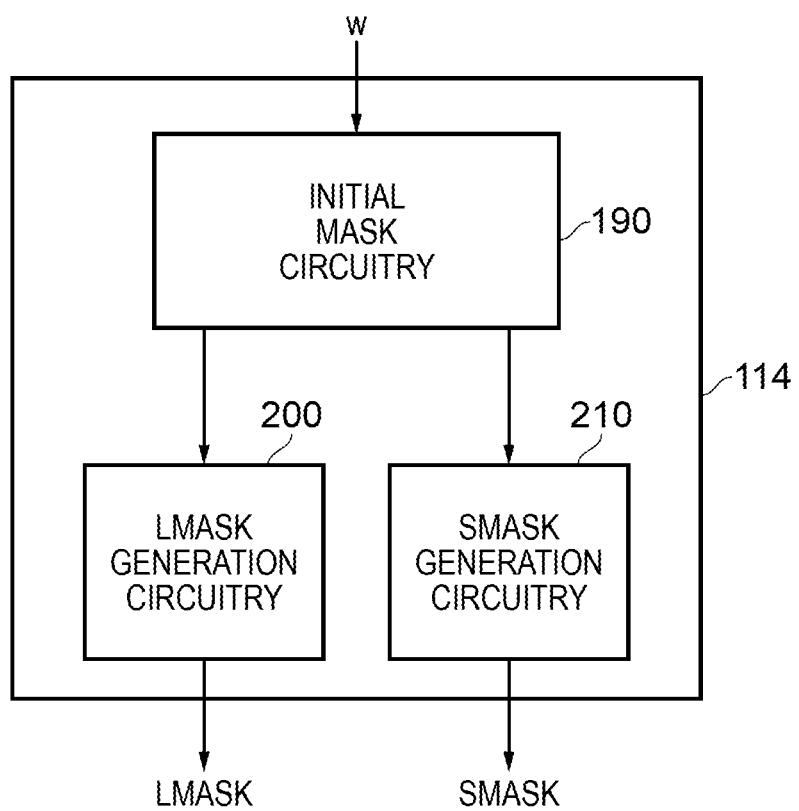
FIG. 5 illustrates components that may be provided within the mask generation block of FIG. 4 in one example.

FIG. 5 illustrates an example of the mask generation circuitry 114 in accordance with one embodiment. The mask generation circuitry 114 comprises initial mask circuitry 190, which receives the intermediate value (w) from the construct w block 110 and performs an initial set of calculations on the intermediate value. These initial calculations are then passed to lmask generation circuitry 200 to calculate an lmask and smask generation circuitry 210 to calculate an smask. The lmask contains the same number of leading zeros as the intermediate value (w) followed by a 1. The remaining bits are all zero. The smask also contains the same number of leading zeros as the intermediate value (w) followed by a 1. The remaining bits are all one. So, for example, given an intermediate value (w) of 000110100100, the lmask would be 000100000000 and the smask would be 000111111111. These masks can be used to either determine whether a significand overflow has occurred, or to extract a particular bit from the difference calculation, as desired.

Figure 6:
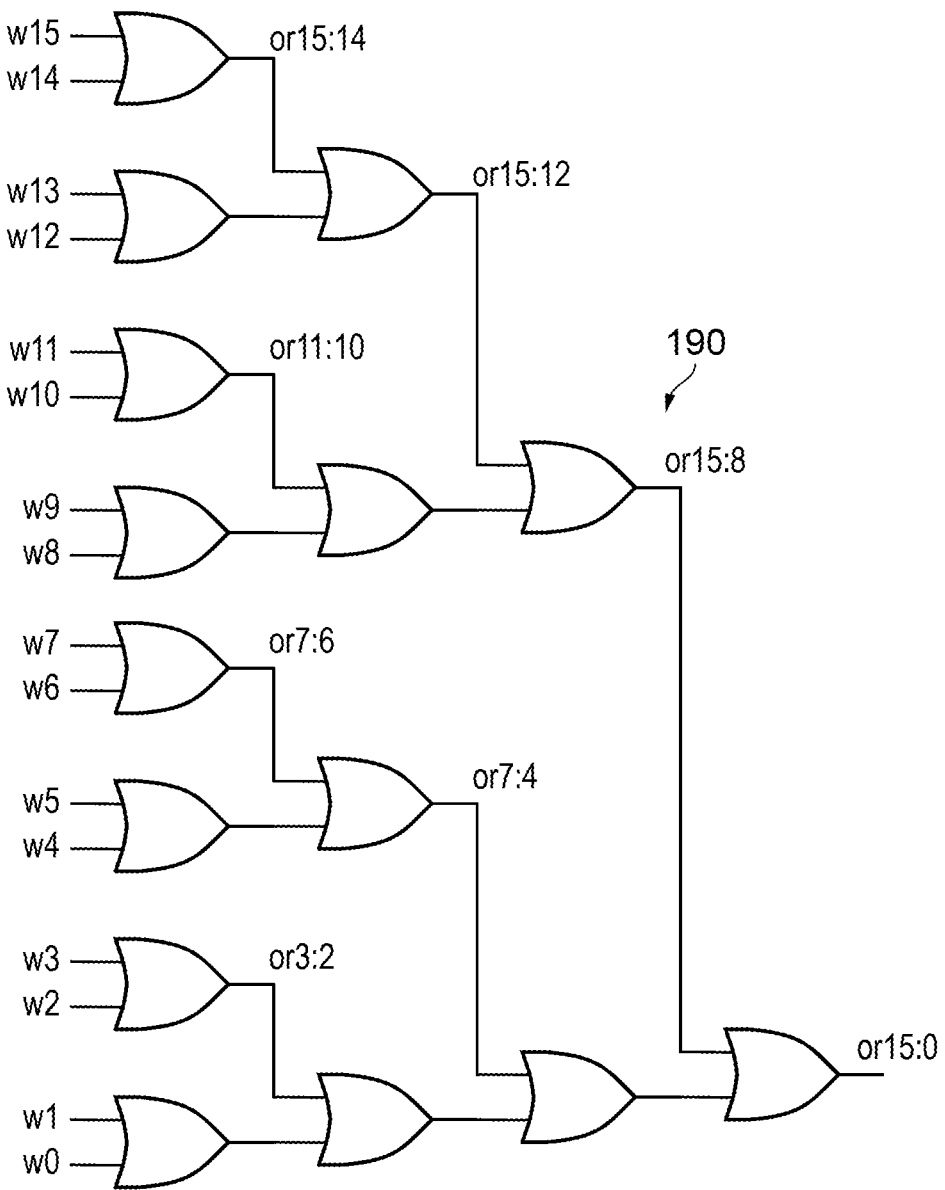
FIG. 6 illustrates an example form of initial mask generation circuitry.

FIG. 6 illustrates an example of initial mask circuitry 190, suitable for a 16-bit number. The skilled person will appreciate that the structure can be generalised to produce an initial set of calculations. The initial calculations represent a logical OR of different subsets of contiguous bits of w. As the skilled person will appreciate, a logical OR of a subset of bits will be '1' if any one of those bits is '1'. Each pair of neighbouring bits (e.g. w0 and w1, w2 and w3, w3 and w4, etc.) are inserted as inputs to an OR gate. Outputs from an OR gate at one level are provided as inputs to an OR gate at the next level. In this way, the number of OR gate halves at each level, until at the top level, there is one OR gate that indicates whether any of the bits in the input are a '1' or not. Additionally, the first input to each OR gate (other than those at the first level) are provided as initial calculations to the lmask generation circuitry 200 and the smask generation circuitry 210. In the example of FIG. 6, the initial calculations include the values or(15:0), or(15:8), or(15:12), or(7:4), or(15:14), or(11:10), or(7:6), or(3:2). Using this information, the most significant '1' for an arbitrary value of '1' can be located quickly. These internal values are used in FIG. 7 to allow us to quickly find the most significant '1' in w (the intermediate value).

Figure 7:
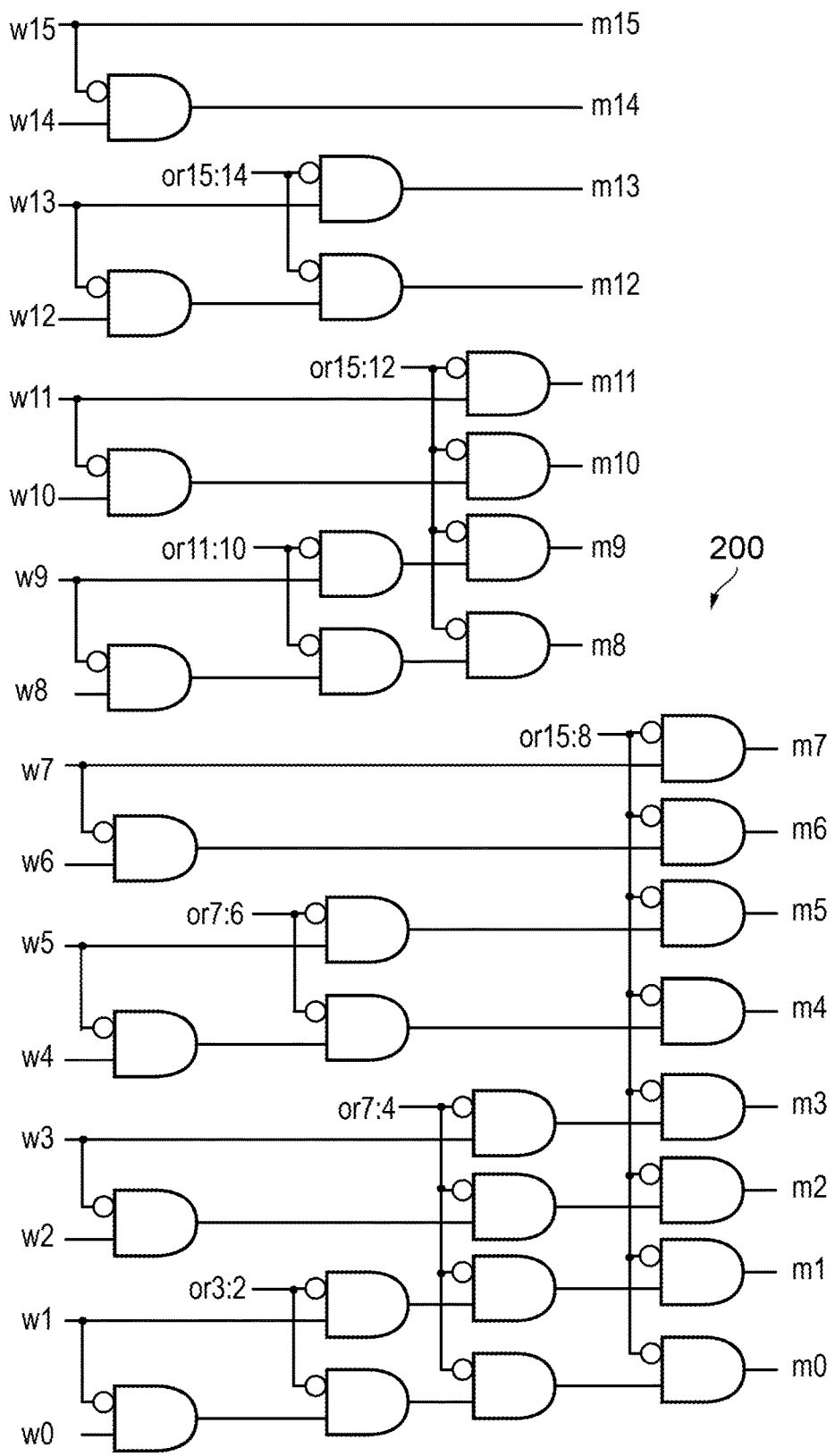
FIG. 7 schematically illustrates an example form of Lmask generation circuitry.

FIG. 7 illustrates lmask generation circuitry 200, which is made up from a number of AND gates, with each of the AND gate inverting one of the two inputs. The lmask generation circuitry uses the initial calculations produced by the initial mask circuitry 190 to produce a series of output bits (m0 . . . m15), which represent the bits of the lmask. At a first level, each group comprises a pair of bits (e.g. w0 and w1, w2 and w3, w3 and w4, etc.), the more significant bit proceeds through, while the less significant bit is received as an input to an AND gate, together with an inverted form of an OR of the more significant bit (i.e. the more significant bit itself at the first level). In other words, within each group, the less significant half will only be a '1' if the more significant half is not a '1'. In the case of a first level, for example, w14 could only be '1' if w15 is not '1'. This results in a pair of outputs for each group, the first indicating if the top half of the group is a '1', the second indicating if the bottom half of the group is a '1'. At each subsequent level, adjacent groups are combined. Therefore, at the second level, the first group relates to the first 4 bits (w0-w3). Again the top half of the bits proceed through automatically, while the less significant half are received as an input to an AND gate, together with an inverted form of an OR of the more significant bits. Again, in other words, within each group, the less significant half will only be a '1' if the more significant half is not a '1'. Hence, in the case of the second level, w3 and w2 proceed through. Conversely, w0 and w1 are each ANDed with or(3:2). This results in four outputs.

The number of outputs is the same at each level. Similarly, at each level, the number of AND gates is equal to b/2, where b is the number of bits of w.

Figure 8:
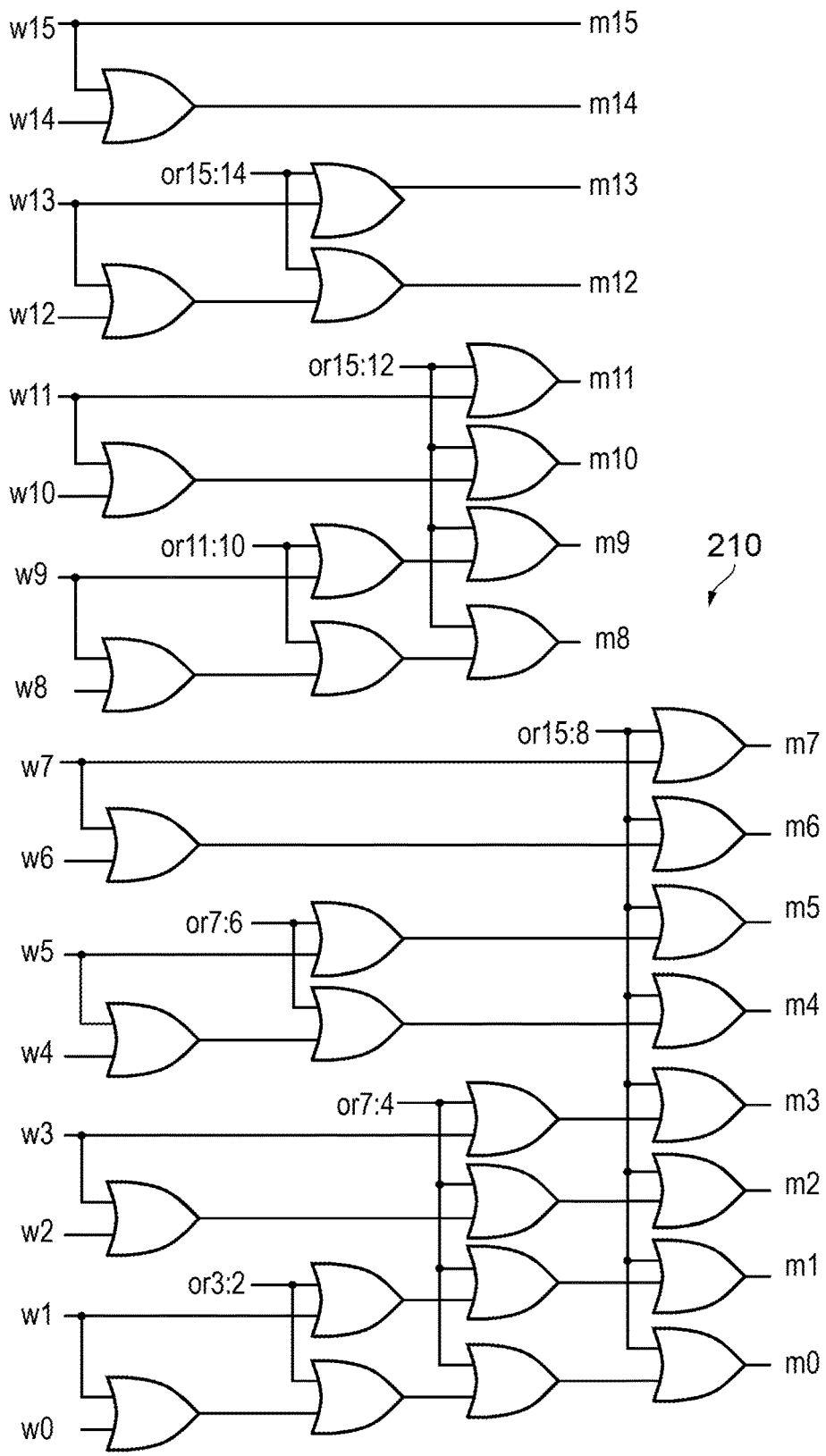
FIG. 8 schematically illustrates an example form of Smask generation circuitry.

FIG. 8 illustrates smask circuitry 210. The smask circuitry corresponds with the lmask circuitry shown in FIG. 7, except that the partially-inverting AND gates are replaced by OR gates.

Figure 9:
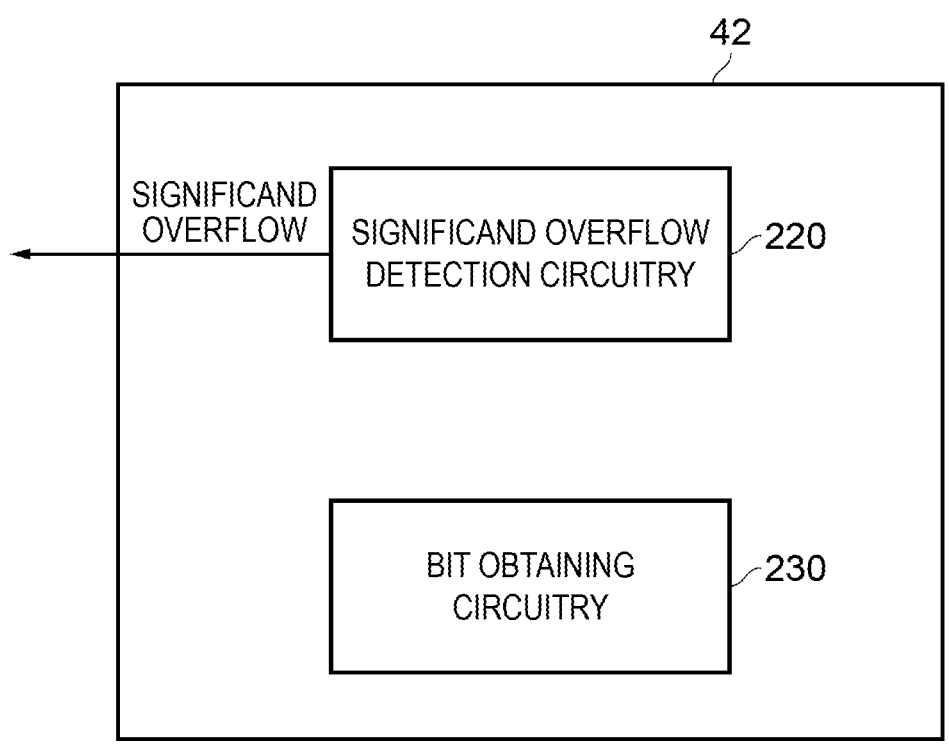
FIG. 9 schematically illustrates an example of circuitry for using masks to detect significand overflow and obtaining particular bits of the difference.

FIG. 9 schematically illustrates overflow and rounding circuitry 42, which uses the lmask and smask to detect significand overflow and obtain particular bits of the selected difference value chosen from the difference values calculated by the adder circuits 24, 26. The overflow and rounding circuitry 42 receives one or more masks produced by the mask generation circuitry 114.

The lmask is used by significand overflow detection circuitry 220 in order to detect a significand overflow. This can be achieved by moving the lmask one bit to the left, performing a bitwise AND operation between the shifted lmask and the difference, and then performing a reduction OR on the result. In practice, however, it is not necessary to actually perform a shift operation and instead, the appropriate bits can be directly wired so that the desired bits can be operated on. In particular, the significand overflow signal can be calculated by the expression |(lmask[105:0] & diff[106:1]).

The overflow and rounding circuitry 42 also includes bit obtaining circuitry 230 to obtain a particular bit from the chosen difference value selected by the multiplexer 34. For example, the requested bit could be an overflow least significant bit, a least significant bit, an overflow guard bit, and a guard bit. The overflow variants of the least significant bit and the guard bit correspond with the least significant bit and guard bit if the significand has overflowed (hence, the position of the overflow guard bit is the same as the least significant bit). Accordingly, the overflow least significant bit can be detected by moving the lmask 52 bits to the right, the overflow guard bit (or least significant bit) can be detected by moving the lmask 53 bits to the right, and the guard bit can be detected by moving the lmask 54 bits to the right. In each case, the shifted lmask is then bitwise ANDed with the difference, and a reduction OR is performed. The number of shifts is dependent on the nature of siga and sigb. In this example, it is assumed that both values are double precision and therefore the significand is 53 bits in length. Again, in practice, it is not necessary to actually shift the lmask. Instead, the appropriate bits can be directly wired in order to operate the relevant bits. The overflow least significant bit can therefore be determined, in this example, by the expression |(lmask[106:51] & diff[55:0]), the least significant bit or overflow guard bit can be determined by the expression |(lmask[106:52] & diff[54:0]), meanwhile, the guard bit can be determined by the expression |(lmask[106:53] & sum[53:0]). The bitwise AND is therefore performed between the top t bits of the lmask and bottom t bits of the selected difference value.

The smask can also be used by the bit obtaining circuitry 230 in order to obtain the overflow sticky bit and the normal sticky bit. The sticky bit is produced as a consequence of performing an OR on all bits following the guard bit. Therefore, it is necessary to use the smask in order to obtain trailing bits from the diff. In the above example of a double precision floating point number, the sticky bits can only be in the lower 54 bits of the difference. Accordingly, calculating the overflow sticky bit is achieved by the expression |(smask[53:0] & diff[53:0]) and the sticky bit is achieved by the expression |(smask[52:0] & diff[52:0]).

Figure 10:
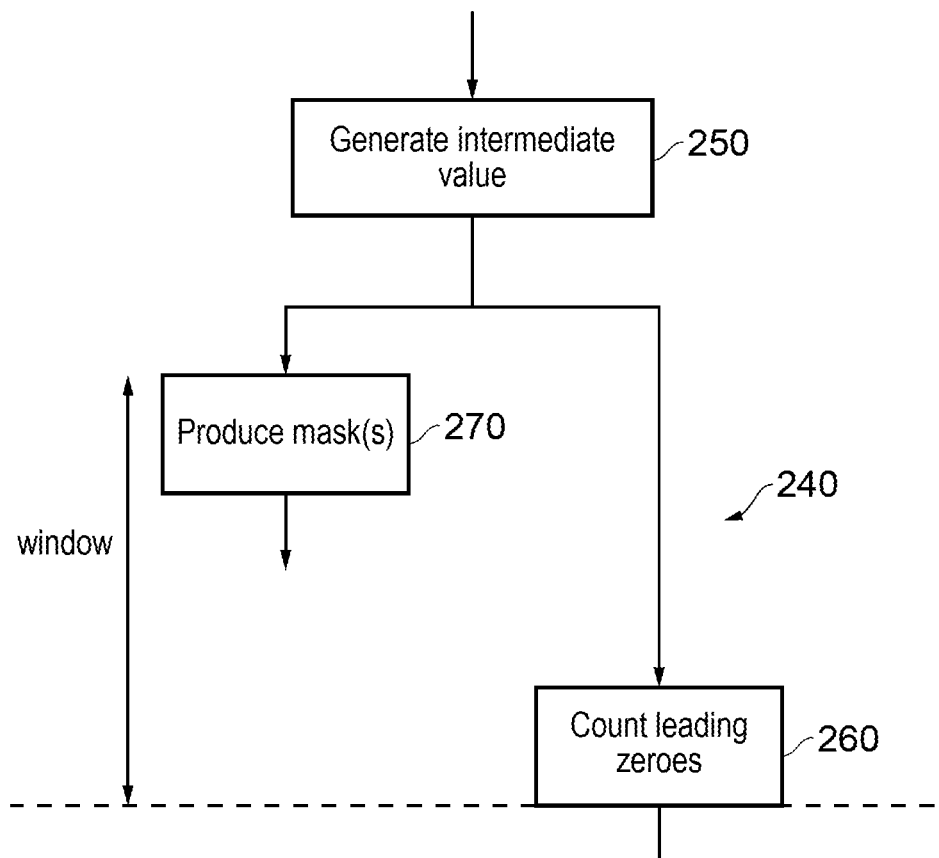
FIG. 10 is a flow diagram illustrating relative timing in the production of the masks and the counting of leading 0s within the circuitry of FIG. 4, in accordance with one example.

FIG. 10 illustrates a flowchart 240 showing an example data processing method in accordance with one example. The process starts at step 250, where an intermediate value (w) is generated. The process then splits into two parts. At a step 260, the estimated number of leading zeros is calculated. This can be achieved by count circuitry 118. During a window of time that ends when step 260 completes, one or more masks are produced at step 270, e.g. by mask generation circuitry 114.

Figure 11:
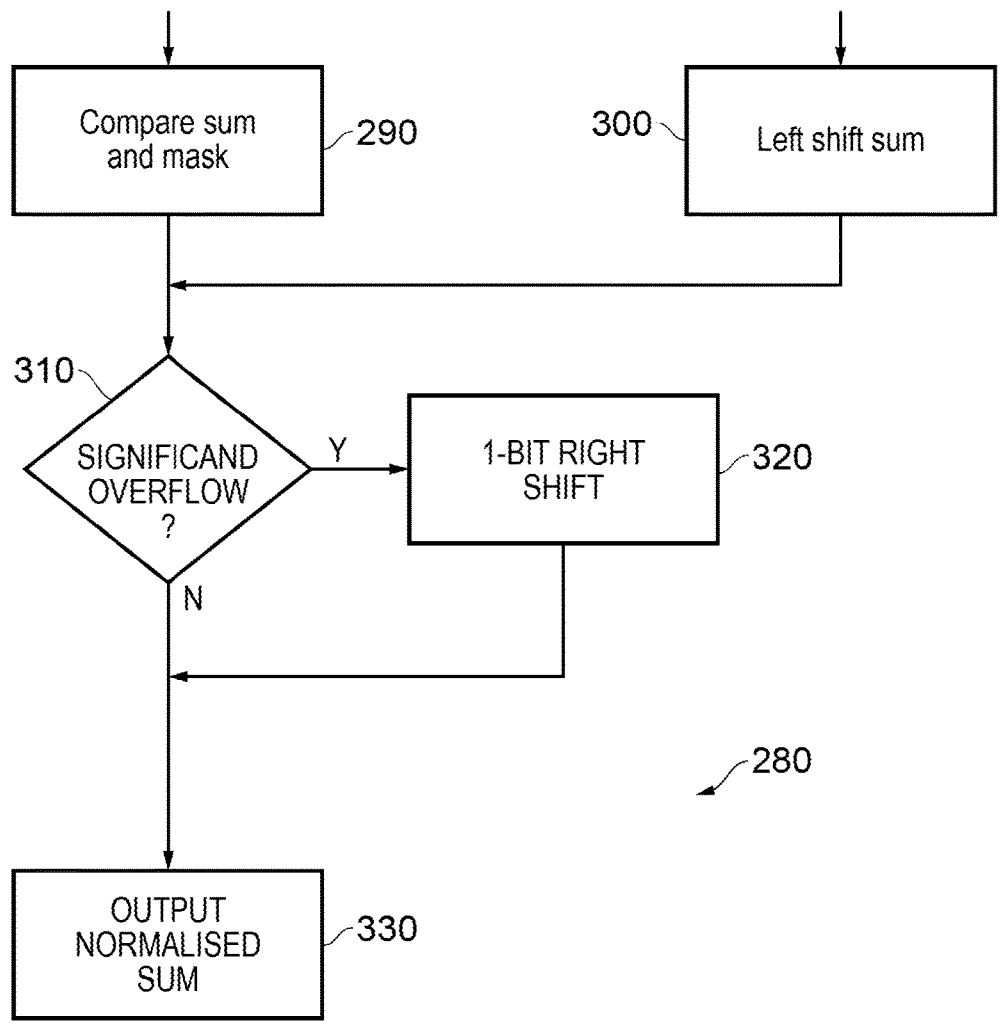
FIG. 11 is a flow diagram illustrating an example of how a mask may be used to detect a significand overflow condition in one example.

FIG. 11 contains a flow chart 280 showing an example of using the generated masks in accordance with one example. At step 290 the selected sum (or difference) is compared with the generated mask. This can be achieved by significand overflow detection circuitry 220. Approximately simultaneously, at step 300 the sum (or difference) is left shifted a number of times indicated by the count circuitry 118. This may be achieved by left shifter 40. In either case, at step 310, it is determined from the significand overflow detection circuitry 220 whether or not a significand overflow has occurred. If so, then at step 320, a 1-bit right shift is performed on the sum/diff (e.g. by right shifter 44). In either case, at step 330, the normalised sum/diff is output.

In a similar way, the bit obtaining circuitry 230 can be used to determine the value of particular bits, regardless of whether a significand overflow has occurred or not. These values could be output in order to perform a rounding operation on the normalised sum, in dependence on those values and the rounding operation being performed.

The above embodiment is therefore able to produce masks for determining significand overflow and for obtaining particular bits of a difference/sum operation more quickly, by using an intermediate value (w) that approximates the number of leading zeros in the difference/sum. In this way, it is possible to normalise the output (and round the output) more quickly than if we used no masks or used masks generated from the leading zero count of the intermediate value (w). This can be particularly useful in "near path" operations, where the exponents of the inputs are the same or are off by one, and can therefore result in numbers with many leading zeros.

Consider a first worked example, in which siga=1001_1010 and sigb=1000_1100. The operation siga-sigb is the same as performing siga+~sigb+1 (this is twos complement subtraction. The result of this operation is 0000_1110 (disregarding any integer overflow). The difference therefore has four leading zeros. The intermediate value will have the same (or one more) leading zeros as the difference. Exactly how w is calculated is beyond the scope of this document and has been discussed elsewhere at length. In this case, the intermediate value is 0000_1001. In other words, four leading zeros are predicted. The lmask would be 0000_1000 and the smask would be 0000_1111. The result of |(lmask[7:0] & diff[8:1]) is 0. Therefore, no overflow has occurred. This can be confirmed by noting that adding the top four bits during the add operation results in 0000, while no carry out occurs during the bottom four bits.

Consider a second worked example, in which siga=1001_1010 and sigb=0110_1111. The result of the operation is 0000_1010. The intermediate value in this case is 0000_0101. The lmask is therefore 0000_0100 and the smask is 0000_0111. Five leading zeros are therefore predicted. However, the result of |(lmask[7:0] & diff[8:1]) is 1. Therefore a significand overflow has occurred. This can be confirmed by noting that if we add the top five bits during the add operation, the result is 00000. Meanwhile, in the bottom three bits, there is a carry out. The prediction by w is therefore off by 1 and so the correct number of leading zeros is 4. In the circuitry of FIG. 1, this would result in the left shifter 40 performing 5 left shifts based on w. The detection of the significand overflow would then result in a further one-bit right shift by right shifter 44 in order to perform a correction for the misprediction.

Figure 12:
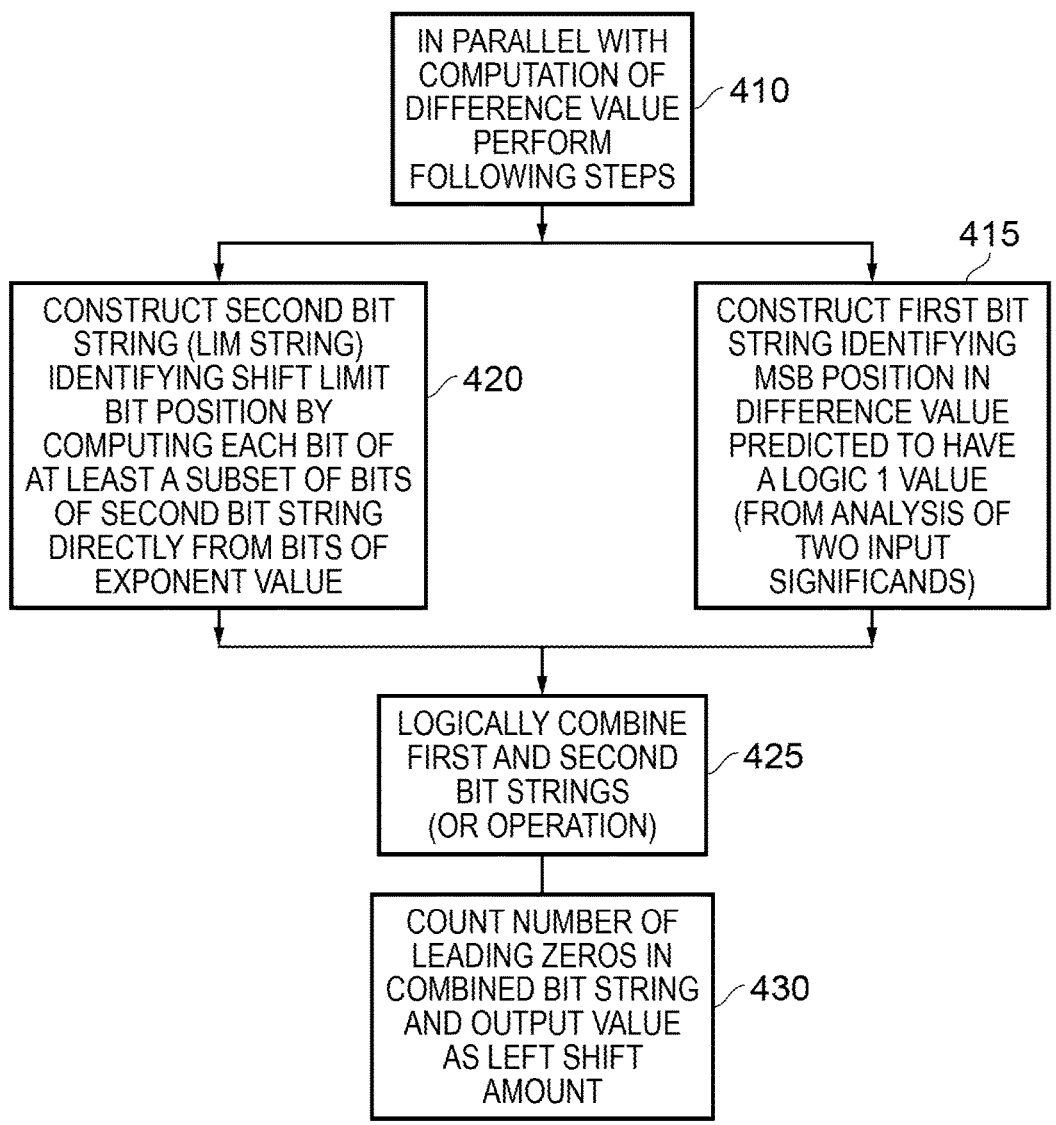
FIG. 12 is a flow diagram illustrating how the components of FIG. 4, other than the mask generation block, may operate in accordance with one example arrangement.

FIG. 12 is a flow diagram illustrating the operation of the circuitry of FIG. 4 in order to estimate the number of leading zeros, in accordance with one example. As indicated by step 410, in parallel with the computation of the difference value by the associated adder circuitry 24, 26, the following steps 415 and 420 are performed in parallel. In particular, at step 415, a first bit string is constructed by the block 110 to identify the most significant bit position in the difference value that is predicted to have a logic one value, this being performed directly from analysis of the two input significands.

In parallel, at step 420, the block 112 is used to construct a second bit string (also referred to herein as the lim string) identifying a shift limit bit position by computing a value for each bit of at least a subset of bits of the second bit string directly from the bits of the exponent value. In the example shown in FIG. 4, it is assumed that the two bit strings produced have an identical number of bits to the number of bits in the difference value, and accordingly in that case when generating the second bit string a computation is performed for each bit position within the lim string. However, in some embodiments it may simplify the implementation to operate on values that have a number of bits that is a power of two. Accordingly, it may be arranged that each of the blocks 110, 112 produce a 128-bit string. In that case, the most significant 107 bits in the string may be computed by the relevant blocks, with the remaining 21 least significant bits merely being padding bits, and set to a predetermined value, for example a logic zero value. The extension of the bits strings to 128 bits by adding 21 least significant bits all set to zero has no effect on the computation performed by the CLZ block 118, which is counting the number of leading zeros (i.e. starting from the most significant bit position), and accordingly does not affect the left shift amount used to control the left shift circuitry 40. Following steps 415 and 420, the first and second bit strings are logically combined at step 425, in one embodiment by performing an OR operation. Thereafter, at step 430, the number of leading zeros in the combined bit string is counted, in order to determine the left shift amount, and a corresponding output value is issued to identify that left shift amount.

Figure 13:
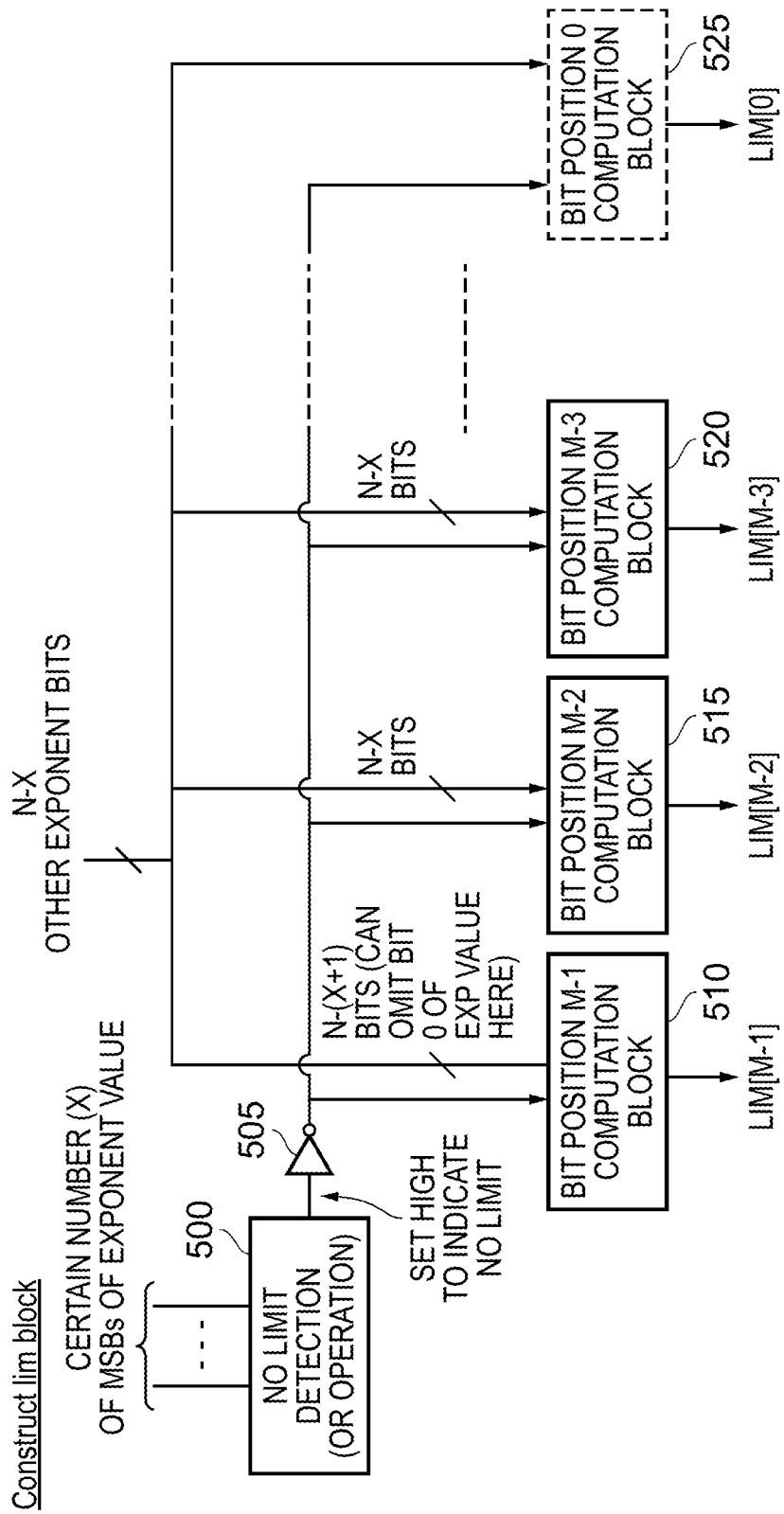
FIG. 13 is a block diagram illustrating components provided within the construct limit block of FIG. 4 in accordance with one example.

FIG. 13 is a block diagram illustrating components provided within the construct lim block 112 in accordance with one example arrangement. In this example, it is assumed that the exponent value has sufficient bits that there are at least a subset of possible exponent values that will be large enough to never require any limit to be placed on the left shift amount determined from the significands. Hence, a certain number of most significant bits of the exponent value (referred to as the most significant X bits in FIG. 13) can be provided to no limit detection circuitry 500. In one embodiment, the no limit detection circuitry can perform a simple OR operation on those most significant bits, such that if any of those most significant bits are set, a logic one value is output by the no limit detection circuitry 500. This value is then in one embodiment inverted by the inverter 505, and provided as an input to each of the separate computation blocks associated with corresponding bit positions in the second bit string. The remaining exponent bits (referred to in FIG. 13 as the N-X bits assuming the exponent has N bits in total) are then also provided to the individual computation blocks 510, 515, 520, 525. As discussed earlier, in one embodiment bit zero of the exponent value can be omitted from the bits provided to the computation block 510 associated with the most significant bit position of the lim string. In this example, it is assumed that an M-bit lim string is produced, and accordingly block 510 is associated with the most significant bit position. By omitting the least significant bit of the exponent value from the inputs to the computation block 510, the computation block can detect situations where all of the other exponent bits are zero, indicating that the biased exponent is either one or zero, and in that case will set bit lim[M-1] to one. In due course, this will result in the CLZ circuit 118 detecting no leading zeros, and accordingly applying no left shift.

Within each of the computation blocks 510, 515, 520, 525, simple logical operations can be applied to the sequence of exponent bits to produce a corresponding output bit for the associated LIM bit position. The actual computations performed will depend on the size of the difference value and the number of bits in the exponent value.

If the number of bits M in the lim bit string is equal to the number of bits in the difference value computed by the associated adder circuit 24, 26, then a corresponding computation block will be provided for every bit position. However, if the lim string is padded in the manner discussed earlier, so as for example to ensure that the lim string has a number of bits that are equal to a power of two, then one or more of the lower significant bits may not need any explicit computation block, and accordingly to illustrate that point the computation block 525 is identified by a dotted box in FIG. 13. In particular, as discussed earlier, a certain number of least significant bits of the lim string may all be set to zero if the lim string is padded in that manner. For example, for double precision numbers where the difference may represent 106 bits, the lim string may be padded so as to be a 128-bit number. Similarly, for single precision operands, the difference value may be 48 bits, and the lim bit string may be padded to produce a 64-bit bit string. Further, for half precision operands, where the difference value may be 22 bits, the lim bit string may be padded to form a 32-bit value. Since the difference is padded on the right, i.e. in a certain number of least significant bit positions, any exponent limit indication in that padded range is not going to affect the left shift computed by the CLZ circuit 118, and accordingly those padded bit positions can have their value set to any arbitrary value.

FIG. 14 schematically illustrates the computations that may be performed by the components shown in FIG. 13 for a specific example where the difference value is a 6-bit difference value, and the exponent value is a 5-bit exponent value. Since the difference value is 6-bits, and hence the maximum left shift is 6-bits, if either of the most significant two bits of the exponent are set to a logic one value, this will indicate that the exponent value is large enough that it will not place any limit on the maximum left shift available. Accordingly, the no limit detection circuitry 500 can receive exponent bits 4 and 3, and perform a logical OR operation on those exponent values in order to generate the no limit signal, referred to in FIG. 14 as "exp_ge_8". That value will hence be set to a logic one value if either bit 4 or bit 3 of the exponent are set, and as shown in the remainder of FIG. 14 the inverted version of that no limit signal is then provided to each of the computation circuits associated with each bit position of the lim bit string. In this example an 8-bit lim bit string is produced so as to produce a lim bit string whose number of bits are a power of two. The most significant bit position computation block (computation block 510 in FIG. 13) produces the lim[7] value by performing logical AND operations using the inverted version of the no limit signal output by the inverter 505, and inverted values of exponent bits 2 and 1. lim[7] will hence be set to a logic one value if all of the exponent values 4 to 1 are logic zero values, but if any of those bits are set to logic one values, lim[7] will be set to zero. When lim[7] is set to one, this will indicate that no shifting is allowed, and from the earlier discussion of FIG. 4 it will be appreciated that in that instance the CLZ circuit 118 will determine there are no leading zeros in the combined bit string produced by the combining circuitry 116.

For each of the other lim bit positions, it will be seen that all of the exponent bits are used once. The lim[6] signal will be set to one if bit 1 of the exponent value is set to one and all of the other exponent bits are set to zero. Hence, in this example the exponent has a value of two, and accordingly a 1-bit shift is allowed.

The computations performed by each of the other computation blocks associated with the various bit positions of the lim bit string are also set out in FIG. 14. In each case, it can be seen that if the exponent value has a value j that is greater than 1, then the shift limit bit position will be set to identify that a left shift of a most j−1 bit positions can be performed.

As shown in FIG. 14, no computation is required for lim[0] and that output can be set to an arbitrary value, as it will never be used as a limit for a 6-bit difference.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
input circuitry to provide a first significand value of a first floating-point operand and a second significand value of a second floating-point operand;
significand shift control circuitry to assert a shift signal when a difference is detected between at least one low order bit of a first exponent value of the first floating-point operand and a corresponding at least one low order bit of a second exponent value of the second floating-point operand;
first processing circuitry to produce a first difference value by performing a first subtraction operation to subtract the second significand value from the first significand value when the shift signal is unasserted, and to subtract a right-shifted version of the second significand value from the first significand value when the shift signal is asserted;
second processing circuitry to produce a second difference value by performing a second subtraction operation to subtract the first significand value from the second significand value when the shift signal is unasserted, and to subtract a right-shifted version of the first significand value from the second significand value when the shift signal is asserted;
first shift estimation circuitry to determine, from the significand values subjected to the first subtraction operation, a first estimated left shift amount;
second shift estimation circuitry to determine, from the significand values subjected to the second subtraction operation, a second estimated left shift amount; and
shifted difference value generation circuitry to produce, as a shifted difference value, the first difference value left shifted by the first estimated left shift amount when the first difference value is a non-negative value, and the second difference value left shifted by the second estimated left shift amount when the second difference value is a non-negative value.

2. An apparatus as claimed in claim 1, wherein the shifted difference value generation circuitry comprises:

selection circuitry to select, as a chosen difference value, one of the first difference value and the second difference value that is a non-negative value; and left shift circuitry to generate the shifted difference value by shifting the chosen difference value by the first estimated left shift amount when the chosen difference value is the first difference value, and by shifting the chosen difference value by the second estimated left shift amount when the chosen difference value is the second difference value.

3. An apparatus as claimed in claim 1, wherein:
the first and second exponent values differ at most by one; and
the significand shift control circuitry is arranged to assert the shift signal when a difference is detected between a least significant bit value of the first and second exponent values.

4. An apparatus as claimed in claim 3, wherein the right-shifted versions of the first and second significand values are formed by right-shifting the first and second significand values, respectively, by one bit position.

5. An apparatus as claimed in claim 1, wherein the first and second significand values comprise a multi-bit fraction value of the corresponding first and second floating-point operands, and the input circuitry is arranged to provide the first and second significand values to include at least one padding bit to the right of a least significant fraction bit of the multi-bit fraction value.

6. An apparatus as claimed in claim 5, wherein the fraction value of the second floating-point operand is expressed using more bits than the fraction value of the first floating-point operand, and the input circuitry is arranged to include more padding bits within the first significand value than within the second significand value so that the first and second significand values are expressed using the same number of bits.

7. An apparatus as claimed in claim 6, wherein the second floating-point operand is an unrounded multiplication result of a previously performed multiplication operation.

8. An apparatus as claimed in claim 1, wherein the input circuitry is arranged to set a most significant bit of the first significand value to 1 when the first exponent value is non-zero, and is arranged to set a most significant bit of the second significand value to 1 when the second exponent value is non-zero.

9. An apparatus as claimed in claim 1, wherein each of the first shift estimation circuitry and the second shift estimation circuitry comprise mask generation circuitry to generate one or more masks in parallel with the generation of the estimated left shift amount.

10. An apparatus as claimed in claim 9, wherein each of the first shift estimation circuitry and the second shift estimation circuitry further comprise:
significand analysis circuitry to generate, from analysis of the significand values subjected to the associated subtraction operation, a first bit string identifying a most significant bit position within the difference value produced by the associated subtraction operation that is predicted to have its bit set to a logic 1 value; and
shift determination circuitry to determine the associated estimated shift amount in dependence on the first bit string;
the mask generation circuitry being arranged to use the first bit string to produce the one or more masks at a same time or before the shift determination circuitry determines the associated estimated shift amount.

11. An apparatus as claimed in claim 10, wherein each of the first shift estimation circuitry and the second shift estimation circuitry further comprise:
shift limiting circuitry to generate from an exponent value a second bit string identifying a shift limit bit position, the shift limiting circuitry having computation circuitry to perform, for each bit position in at least a subset of bit positions of the second bit string, an associated computation using bits of the exponent value to determine a value for that bit position within the second bit string, the associated computation being different for different bit positions; and
combining circuitry to generate a combined bit string from the first and second bit strings;
the shift determination circuitry being arranged to determine the associated estimated shift amount from the combined bit string.

12. An apparatus as claimed in claim 11, wherein the shift limiting circuitry within the first shift estimation circuitry is arranged to use the first exponent value and the shift limiting circuitry within the second shift estimation circuitry is arranged to use the second exponent value.

13. An apparatus as claimed in claim 9, further comprising:
significand overflow detection circuitry to detect, based on said one or more masks, and at least one of the first difference value and the second difference value, an overflow condition where the shifted difference value will overflow; and
shift correction circuitry, responsive to detection of the overflow condition, to perform a corrective shift operation such that the shifted difference value is right-shifted by one bit position.

14. An apparatus as claimed in claim 9, wherein said one or more masks comprise information used for rounding determination, and the apparatus further comprises:
rounding determination circuitry to set a rounding bit value in dependence on a rounding determination operation performed using the one or more masks; and
rounding circuitry to add the rounding bit value to the shifted difference value.

15. An apparatus as claimed in claim 14, wherein:
the second floating-point operand is an unrounded multiplication result of a previously performed multiplication operation;
both the shifted difference value and the rounding bit value is produced from the first and second significand values in one clock cycle; and
the rounding circuitry is arranged to add the rounding bit value to the shifted difference value in a subsequent clock cycle.

16. An apparatus as claimed in claim 1, wherein the shifted difference value is produced from the first and second significand values in one clock cycle.

17. A method of operating an apparatus to subtract a first significand value of a first floating-point operand and a second significand value of a second floating-point operand, comprising:
asserting a shift signal when a difference is detected between at least one low order bit of a first exponent value of the first floating-point operand and a corresponding at least one low order bit of a second exponent value of the second floating-point operand;
employing first processing circuitry to produce a first difference value by performing a first subtraction operation to subtract the second significand value from the first significand value when the shift signal is unasserted, and to subtract a right-shifted version of the second significand value from the first significand value when the shift signal is asserted;

employing second processing circuitry to produce a second difference value by performing a second subtraction operation to subtract the first significand value from the second significand value when the shift signal is unasserted, and to subtract a right-shifted version of the first significand value from the second significand value when the shift signal is asserted;

determining, from the significand values subjected to the first subtraction operation, a first estimated left shift amount;

determining, from the significand values subjected to the second subtraction operation, a second estimated left shift amount; and producing, as a shifted difference value, the first difference value left shifted by the first estimated left shift amount when the first difference value is a non-negative value, and the second difference value left shifted by the second estimated left shift amount when the second difference value is a non-negative value.

18. An apparatus comprising:

input means for providing a first significand value of a first floating-point operand and a second significand value of a second floating-point operand;

significand shift control means for asserting a shift signal when a difference is detected between at least one low order bit of a first exponent value of the first floating-point operand and a corresponding at least one low order bit of a second exponent value of the second floating-point operand;

first processing means for producing a first difference value by performing a first subtraction operation to subtract the second significand value from the first significand value when the shift signal is unasserted, and to subtract a right-shifted version of the second significand value from the first significand value when the shift signal is asserted;

second processing means for producing a second difference value by performing a second subtraction operation to subtract the first significand value from the second significand value when the shift signal is unasserted, and to subtract a right-shifted version of the first significand value from the second significand value when the shift signal is asserted;

first shift estimation means for determining, from the significand values subjected to the first subtraction operation, a first estimated left shift amount;

second shift estimation means for determining, from the significand values subjected to the second subtraction operation, a second estimated left shift amount; and shifted difference value generation means for producing, as a shifted difference value, the first difference value left shifted by the first estimated left shift amount when the first difference value is a non-negative value, and the second difference value left shifted by the second estimated left shift amount when the second difference value is a non-negative value.

* * * * *